(12) United States Patent
Xu et al.

(10) Patent No.: US 12,279,240 B2
(45) Date of Patent: Apr. 15, 2025

(54) SYNCHRONIZATION SIGNAL BLOCK LOCATION FOR FRAME BASED EQUIPMENT MODE IN CELLULAR COMMUNICATIONS

(71) Applicant: QUALCOMM Incorporated, San Diego, CA (US)

(72) Inventors: Changlong Xu, Beijing (CN); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/758,438

(22) PCT Filed: Feb. 14, 2020

(86) PCT No.: PCT/CN2020/075187
§ 371 (c)(1),
(2) Date: Jul. 6, 2022

(87) PCT Pub. No.: WO2021/159434
PCT Pub. Date: Aug. 19, 2021

(65) Prior Publication Data
US 2023/0171748 A1 Jun. 1, 2023

(51) Int. Cl.
*H04J 3/00* (2006.01)
*H04W 72/0446* (2023.01)
(52) U.S. Cl.
CPC .............................. *H04W 72/0446* (2013.01)
(58) Field of Classification Search
CPC ......... H04W 72/0446; H04W 74/0816; H04W 24/10; H04W 56/001
See application file for complete search history.

(56) References Cited

U.S. PATENT DOCUMENTS

2019/0387412 A1 12/2019 Kim et al.
2020/0037354 A1* 1/2020 Li ..................... H04W 74/0808
(Continued)

FOREIGN PATENT DOCUMENTS

| CN | 110167134 A | 8/2019 |
|----|-------------|--------|
| CN | 110463311 A | 11/2019 |
| WO | 2020032725 A1 | 2/2020 |
| WO | 2020032727 A1 | 2/2020 |

OTHER PUBLICATIONS

International Search Report and Written Opinion—PCT/CN2020/075187—ISA/EPO—Nov. 11, 2020.
(Continued)

*Primary Examiner* — Abdelnabi O Musa
(74) *Attorney, Agent, or Firm* — Dalei Dong; Harrity & Harrity, LLP

(57) ABSTRACT

This disclosure provides systems, methods and apparatus for cellular communications. In one aspect, a UE determines an FFP of a cell signal for the UE in a frame based equipment mode, determines one or more SSB positions in the cell signal based on the FFP, and performs radio management of the UE based at least in part on the one or more invalid SSB candidate positions. Performing radio management may include using one or more SSB positions in the FFP exclusive of the one or more invalid SSB candidate positions. Radio management may include PDSCH rate matching, radio link monitoring or measurement, or radio resource management. In some implementations, the one or more SSB positions are SSB positions after a first eight SSB positions in an FFP. In some other implementations, the one or more SSB positions are SSB positions that at least partially overlap an idle period between FFPs.

35 Claims, 16 Drawing Sheets

(56) References Cited

U.S. PATENT DOCUMENTS

| | | | | |
|---|---|---|---|---|
| 2021/0297969 | A1* | 9/2021 | Myung | H04W 74/0816 |
| 2022/0110152 | A1* | 4/2022 | Lim | H04W 74/006 |
| 2022/0183064 | A1* | 6/2022 | Talarico | H04W 74/0816 |
| 2022/0240320 | A1* | 7/2022 | Zhang | H04W 56/001 |
| 2022/0248471 | A1* | 8/2022 | Zhang | H04W 74/0833 |
| 2023/0035989 | A1* | 2/2023 | Awadin | H04W 72/569 |
| 2023/0141148 | A1* | 5/2023 | Singh | H04W 74/0816 |
| | | | | 370/329 |
| 2023/0224891 | A1* | 7/2023 | Noh | H04L 5/0048 |
| | | | | 370/329 |
| 2023/0389071 | A1* | 11/2023 | Li | H04W 72/23 |

OTHER PUBLICATIONS

Qualcomm Incorporated: "Initial Access and Mobility Procedures for NR Unlicensed", 3GPP TSG RAN WGI Meeting #98bis, R1-1911098, 3rd Generation Partnership Project, Mobile Competence Centre, 650, Route Des Lucioles, F-06921 Sophia-Antipolis Cedex, France, vol. RAN WG1, No. Chongqing, CN, Oct. 14, 2019-Oct. 20, 2019, Oct. 5, 2019, 15 Pages, XP051808837, p. 2.

Qualcomm Incorporated: "TP For Initial Access and Mobility Procedures for NR Unlicensed", 3GPP TSG RAN WG1 Meeting #100e, R1-2000957, 3rd Generation Partnership Project, Mobile Competence Centre, 650, Route Des Lucioles, F-06921 Sophia-Antipolis Cedex, France, vol. RAN WG1, No. Feb. 24, 2020-Mar. 6, 2020, Feb. 15, 2020, 8 Pages, XP051853532, p. 5, p. 6.

Supplementary European Search Report—EP20919301—Search Authority—Berlin—Oct. 4, 2023.

Zte et al., "Remaining Issues on Channel Access Procedure for NR-U", R1-1911822, 3GPP TSG RAN WG1 Meeting #99, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823016, pp. 1-13, Para [02.7].

Qualcomm Incorporated: "Initial Access and Mobility Procedures for NR Unlicensed", 3GPP TSG RAN WG1 Meeting #98bis, R1-1911098, Chongqing, CN, Oct. 14-Oct. 20, 2019, pp. 1-15.

* cited by examiner

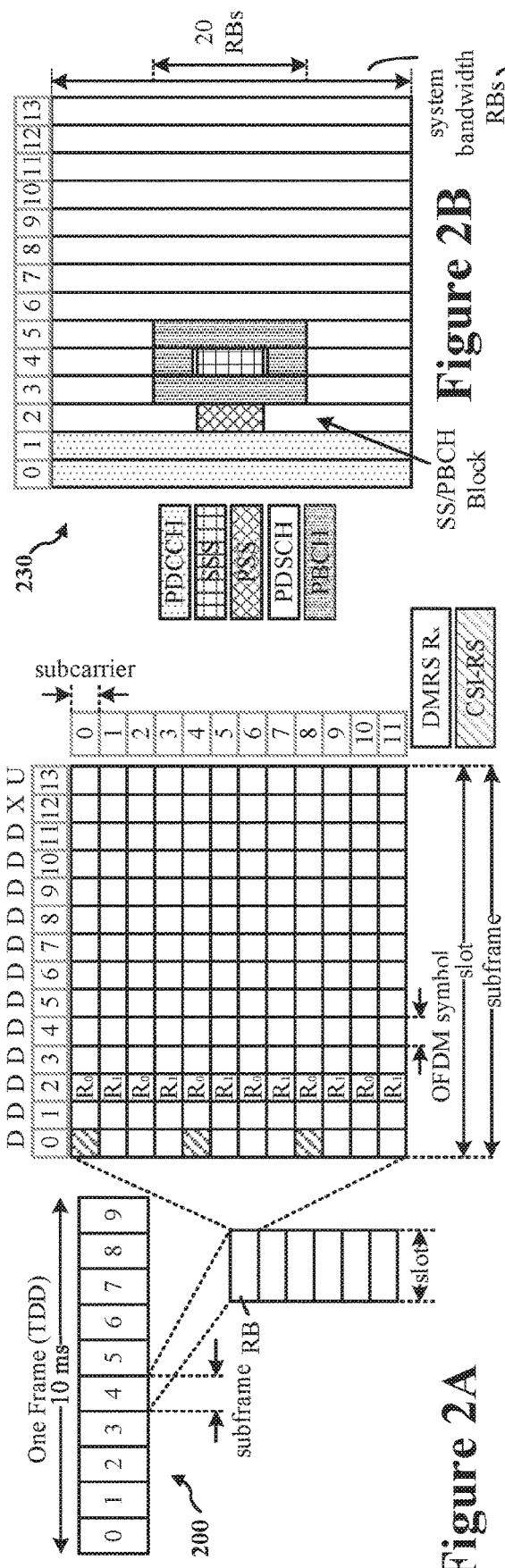
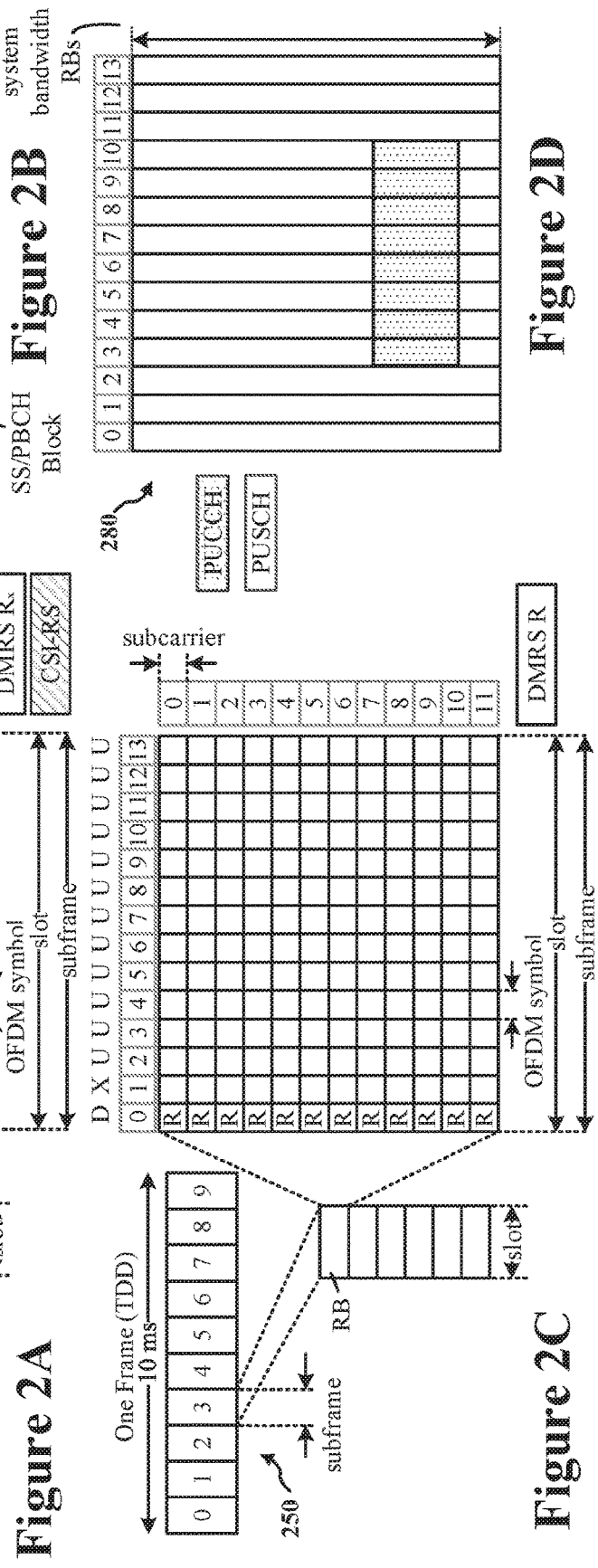
Figure 2A
Figure 2B
Figure 2C
Figure 2D

| Fixed Frame Period | Null SSB positions with 30KHz SCS SSB | | | | | Null SSB positions with 15KHz SCS SSB |
|---|---|---|---|---|---|---|
| 1ms | N/A | | | | | N/A |
| 2ms | N/A | | | | | N/A |
| 2.5ms | 8,9,18,19 | | | | | N/A |
| 4ms | A | B | C | D | | N/A |
| | 8-15 | 8-11 | 16-19 | 12-19 | | |
| 5ms | 8 - 19 | | | | | 8,9 |
| 10ms | 8 - 19 | | | | | 8,9 |

| FFP | Idle length | SSB positions in idle period for 30kHz SCS | | | | SSB positions in idle period for 15kHz SCS | | | |
|---|---|---|---|---|---|---|---|---|---|
| 1ms | 100us | 3,7,11,15,19 | | | | N/A | | | |
| 2ms | 100us | A,C | B,D | | | N/A | | | |
| | | 7,15 | 3,11,19 | | | | | | |
| 2.5ms | 125us | 9,19 | | | | N/A | | | |
| 4ms | 200us | A | B | C | D | A | B | C | D |
| | | 15 | 11 | 7 | 3,19 | 7 | 5 | 3 | 1,9 |
| 5ms | 250us | 19 | | | | 9 | | | |
| 10ms | 500us | N/A | | | | N/A | | | |

Figure 12

| Fixed Frame Period | Null SSB positions with 30KHz SCS SSB | Null SSB positions with 15KHz SCS SSB |
|---|---|---|
| 1ms | 3,7,11,15,19 | N/A |
| 2ms | A,C: 7,15 ; B,D: 3,11,19 | N/A |
| 2.5ms | 8,9,18,19 | N/A |
| 4ms | A: 8-15 ; B: 8-11 ; C: 7,16-19 ; D: 3,12-19 | A: 7 ; B: 5 ; C: 3 ; D: 1,9 |
| 5ms | 8-19 | 8,9 |
| 10ms | 8-19 | 8,9 |

SYNCHRONIZATION SIGNAL BLOCK LOCATION FOR FRAME BASED EQUIPMENT MODE IN CELLULAR COMMUNICATIONS

TECHNICAL FIELD

This disclosure relates generally to wireless communications and, more specifically, to a user equipment operation and configuration based on synchronization signal block locations in cellular communications configured for frame based equipment mode.

DESCRIPTION OF THE RELATED ART

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted m various telecommunication standards to provide a common protocol that enables different wireless devices to communicate on a municipal, national, regional, and even global level. An example telecommunication standard is 5G New Radio (NR), which is part of a continuous mobile broadband evolution promulgated by the Third Generation Partnership Project (3GPP) to meet new requirements associated with latency, reliability, security, scalability, and other requirements. 5G NR includes services associated with enhanced mobile broadband (eMBB), massive machine type communications (mMTC), and ultra-reliable low latency communications (URLLC). There exists a need for further improvements in 5G NR technology. These improvements also may be applicable to other multi-access technologies and the telecommunication standards that employ these technologies.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method for wireless communication. The method may be performed by a user equipment (UE), and may include determining a fixed frame period (FFP) for a frame based equipment (FBE) mode of the UE, determining one or more invalid synchronization signal block (SSB) candidate positions based at least m part on the FFP, and performing radio management based at least in part on the one or more invalid SSB candidate positions. Performing radio management based at least in part on the one or more invalid SSB candidate positions may include performing radio management using one or more SSB positions in the FFP exclusive of the one or more invalid SSB candidate positions Radio management of the UE may include one or more of physical downlink shared channel (PDSCH) rate matching (RM), radio link monitoring or measurement (RLM), or radio resource management (RRM).

In some implementations, the method includes determining a subcarrier spacing (SCS) for SSBs. Determining the one or more invalid SSB candidate positions may also be based at least m part on the SCS. In some further implementations, when the FFP is 2.5 milliseconds and the SCS is 30 kilohertz, the one or more invalid SSB candidate positions include positions 8, 9, 18, and 19. When the FFP is 4 milliseconds and the SCS is 30 kilohertz, the one or more invalid SSB candidate positions include positions 8, 9, 10, 11, 12, 13, 14, and 15 for a first 5 milliseconds of a 20 millisecond period. When the FFP is 4 milliseconds and the SCS is 30 kilohertz, the one or more invalid SSB candidate positions include positions 8, 9, 10, and 11 for a second 5 milliseconds of a 20 millisecond period. When the FFP is 4 milliseconds and the SCS is 30 kilohertz, the one or more invalid SSB candidate positions include positions 8, 9, 10, and 11 for a second 5 milliseconds of a 20 millisecond period. When the FFP is 4 milliseconds and the SCS is 30 kilohertz, the one or more invalid SSB candidate positions include positions 16, 17, 18, and 19 for a third 5 milliseconds of a 20 millisecond period. When the FFP is 4 milliseconds and the SCS is 30 kilohertz, the one or more invalid SSB candidate positions include positions 12, 13, 14, 15, 16, 17, 18, and 19 for a fourth 5 milliseconds of a 20 millisecond period. When the FFP is 5 milliseconds and the SCS is 30 kilohertz, the one or more invalid SSB candidate positions include positions 8, 9, 10, 11, 12, 13, 14, 15, 16, 17, 18, and 19. When the FFP is 10 milliseconds and the SCS is 30 kilohertz, the one or more invalid SSB candidate positions include positions 8, 9, 10, 11, 12, 13, 14, 15, 16, 17, 18, and 19. When the FFP is 5 milliseconds and the SCS is 15 kilohertz, the one or more invalid SSB candidate positions include positions 8 and 9. When the FFP is 10 milliseconds and the SCS is 15 kilohertz, the one or more invalid SSB candidate positions include positions 8 and 9.

The method may include determining that a first eight SSB positions in each FFP are valid. Performing radio management of the UE using one or more SSB positions includes using one or more of the first eight SSB positions in each FFP. When the SCS is 15 kilohertz, determining a final two SSB positions out of a defined ten SSB positions in each FFP are invalid. when the SCS is 30 kilohertz, determining a final twelve SSB positions out of a defined twenty SSB positions in each FFP are invalid.

Another innovative aspect of the subject matter described in this disclosure can be implemented as a method for wireless communication. The method may be performed by a user equipment (UE), and may include determining a fixed frame period (FFP) for a frame based equipment (FBE) mode of the UE to be 5 milliseconds or 10 milliseconds and limiting a discovery reference signal (DRS) window length based at least in part on the FFP. In some implementations, the DRS window length is limited by configuring a parameter DiscoveryBurst-WindowLength-r16. The method may include determining that a subcarrier spacing (SCS) for synchronization signal blocks (SSBs) in the cell signal is 30 kilohertz and determining the parameter DiscoveryBurst-WindowLength-r16 to be 2 milliseconds in response to determining the SCS is 30 kilohertz. If the parameter DiscoveryBurst-WindowLength-r16 is not configured, determining the parameter DiscoveryBurst-WindowLength-r16 to be 2 milliseconds may include assuming, by the UE, that the parameter DiscoveryBurst-WindowLength-r16 is 2 milliseconds. In some other implementations, the method includes determining that a subcarrier spacing (SCS) for synchronization signal blocks (SSBs) in the cell signal is 15 kilohertz and determining the range to be 4 milliseconds in response to determining the SCS is 15 kilohertz. If the parameter DiscoveryBurst-WindowLength-r16 is not configured, determining the parameter DiscoveryBurst-WindowLength-r16 to be 4 milliseconds includes assuming, by the UE, that the parameter DiscoveryBurst-WindowLength-r16 is 4 milliseconds.

Another innovative aspect of the subject matter described in this disclosure can be implemented as a method for wireless communication. The method may be performed by a user equipment (UE), and may include determining a fixed frame period (FFP) for a frame based equipment (FBE) mode of the UE, determining one or more invalid synchronization signal block (SSB) candidate positions at least partially overlapping an idle period of the FFP based at least in part on the FFP, and performing radio management based at least in part on the one or more invalid SSB candidate positions. In some implementations, performing radio management based at least in part on the one or more invalid SSB candidate positions includes performing radio management using one or more SSB positions in the FFP exclusive of the one or more invalid SSB candidate positions. Radio management of the UE may include one or more of physical downlink shared channel (PDSCH) rate matching, radio link monitoring or measurement (RLM), or radio resource management (RRM).

In some implementations, the method includes determining an idle length of the idle period. Determining the one or more invalid SSB candidate positions may also be based at least in part on the idle length. The method may also include determining a subcarrier spacing (SCS) of SSBs. Determining the one or more invalid SSB candidate positions may also be based at least in part on the SCS.

In some implementations, when the FFP is 1 milliseconds, the idle length is 100 microseconds, and the SCS is 30 kilohertz, the one or more invalid SSB candidate positions include positions 3, 7, 11, 15 and 19. When the FFP is 2 milliseconds, the idle length is 100 microseconds, and the SCS is 30 kilohertz, the one or more invalid SSB candidate positions include positions 7 and 15 of a first 5 milliseconds of a 20 millisecond period. When the FFP is 2 milliseconds, the idle length is 100 microseconds, and the SCS is 30 kilohertz, the one or more invalid SSB candidate positions include positions 7 and 15 of a third 5 milliseconds of a 20 millisecond period. When the FFP is 2 milliseconds, the idle length is 100 microseconds, and the SCS is 30 kilohertz, the one or more invalid SSB candidate positions include positions 3, 11, and 19 of a second 5 milliseconds of a 20 millisecond period. When the FFP is 2 milliseconds, the idle length is 100 microseconds, and the SCS is 30 kilohertz, the one or more invalid SSB candidate positions include positions 3, 11, and 19 of a fourth 5 milliseconds of a 20 millisecond period. When the FFP is 2.5 milliseconds, the idle length is 125 microseconds, and the SCS is 30 kilohertz, the one or more invalid SSB candidate positions include positions 9 and 19. When the FFP is 4 milliseconds, the idle length is 200 microseconds, and the SCS is 30 kilohertz, the one or more invalid SSB candidate positions include position 15 of a first 5 milliseconds of a 20 millisecond period. When the FFP is 4 milliseconds, the idle length is 200 microseconds, and the SCS is 30 kilohertz, the one or more invalid SSB candidate positions include position 11 of a second 5 milliseconds of a 20 millisecond period. When the FFP is 4 milliseconds, the idle length is 200 microseconds, and the SCS is 30 kilohertz, the one or more invalid SSB candidate positions include position 7 of a third 5 milliseconds of a 20 millisecond period. When the FFP is 4 milliseconds, the idle length is 200 microseconds, and the SCS is 30 kilohertz, the one or more invalid SSB candidate positions include positions 3 and 19 of a fourth 5 milliseconds of a 20 millisecond period. When the FFP is 5 milliseconds, the idle length is 250 microseconds, and the SCS is 30 kilohertz, the one or more invalid SSB candidate positions include position 19. When the FFP is 4 milliseconds, the idle length is 200 microseconds, and the SCS is 15 kilohertz, the one or more invalid SSB candidate positions include position 7 of a first 5 milliseconds of a 20 millisecond period. When the FFP is 4 milliseconds, the idle length is 200 microseconds, and the SCS is 15 kilohertz, the one or more invalid SSB candidate positions include position 5 of a second 5 milliseconds of a 20 millisecond period. When the FFP is 4 milliseconds, the idle length is 200 microseconds, and the SCS is 15 kilohertz, the one or more invalid SSB candidate positions include position 3 of a third 5 milliseconds of a 20 millisecond period. When the FFP is 4 milliseconds, the idle length is 200 microseconds, and the SCS is 15 kilohertz, the one or more invalid SSB candidate positions include positions 1 and 9 of a fourth 5 milliseconds of a 20 millisecond period. When the FFP is 5 milliseconds, the idle length is 250 microseconds, and the SCS is 15 kilohertz, the one or more invalid SSB candidate positions include position 9.

In some implementations, the method includes determining an SSB position at least partially overlaps the idle period and determining that the SSB position is included in the one or more invalid SSB candidate positions based at least in part on determining that the SSB position at least partially overlaps the idle period.

Another innovative aspect of the subject matter described in this disclosure can be implemented as a method for wireless communication. The method may be performed by a user equipment (UE), and may include determining a fixed frame period (FFP) for a frame based equipment (FBE) mode of the UE, determining a subcarrier spacing (SCS) of synchronization signal blocks (SSBs) in the cell signal, determining one or more invalid SSB candidate positions based at least in part on the FFP and the SCS, and performing radio management based at least in part on the one or more invalid SSB candidate positions. In some implementations, performing radio management based at least in part on the one or more invalid SSB candidate positions includes performing radio management using one or more SSB positions in the FFP exclusive of the one or more invalid SSB candidate positions. Radio management may include one or more of physical downlink shared channel (PDSCH) rate matching (RM), radio link monitoring or measurement (RLM), or radio resource management (RRM).

When the FFP is 1 milliseconds and the SCS is 30 kilohertz, the one or more invalid SSB candidate positions include positions 3, 7, 11, 15, and 19. When the FFP is 2 milliseconds and the SCS is 30 kilohertz, the one or more invalid SSB candidate positions include positions 7 and 15 of a first 5 milliseconds of a 20 millisecond period. When the FFP is 2 milliseconds and the SCS is 30 kilohertz, the one or more invalid SSB candidate positions include positions 7 and 15 of a third 5 milliseconds of a 20 millisecond period. When the FFP is 2 milliseconds and the SCS is 30 kilohertz, the one or more invalid SSB candidate positions include positions 3, 11, and 19 of a second 5 milliseconds of a 20 millisecond period. When the FFP is 2 milliseconds and the SCS is 30 kilohertz, the one or more invalid SSB candidate positions include positions 3, 11, and 19 of a fourth 5 milliseconds of a 20 millisecond period. When the FFP is 2.5 milliseconds and the SCS is 30 kilohertz, the one or more invalid SSB candidate positions include positions 8, 9, 18, and 19 When the FFP is 4 milliseconds and the SCS is 30 kilohertz, the one or more invalid SSB candidate positions include positions 8, 9, 10, 11, 12, 13, 14, and 15 of a first 5 milliseconds of a 20 millisecond period. When the FFP is 4 milliseconds and the SCS is 30 kilohertz, the one or more invalid SSB candidate positions include positions 8, 9, 10, and 11 of a second 5 milliseconds of a 20 millisecond period. When the FFP is 4 milliseconds and the SCS is 30 kilohertz, the one or more invalid SSB candidate positions include positions 7, 16, 17, 18, and 19 of a third 5 milliseconds of a 20 millisecond period. When the FFP is 4 milliseconds and the SCS is 30 kilohertz, the one or more invalid SSB candidate positions include positions 3, 12, 13, 14, 15, 16, 17, 18, and 19 of a fourth 5 milliseconds of a 20 millisecond period. When the FFP is 5 milliseconds and the SCS is 30 kilohertz, the one or more invalid SSB candidate positions include positions 8, 9, 10, 11, 12, 13, 14, 15, 16, 17, 18, and 19. When the FFP is 10 milliseconds and the SCS is 30 kilohertz, the one or more invalid SSB candidate positions include positions 8, 9, 10, 11, 12, 13, 14, 15, 16, 17, 18, and 19. When the FFP is 4 milliseconds and the SCS is 15 kilohertz, the one or more invalid SSB candidate positions include position 7 of a first 5 milliseconds of a 20 millisecond period. When the FFP is 4 milliseconds and the SCS is 15 kilohertz, the one or more invalid SSB candidate positions include position 5 of a second 5 milliseconds of a 20 millisecond period. When the FFP is 4 milliseconds and the SCS is 15 kilohertz, the one or more invalid SSB candidate positions include position 3 of a third 5 milliseconds of a 20 millisecond period. When the FFP is 4 milliseconds and the SCS is 15 kilohertz, the one or more invalid SSB candidate positions include positions 1 and 9 of a fourth 5 milliseconds of a 20 millisecond period. When the FFP is 5 milliseconds, the idle length is 250 microseconds, and the SCS is 15 kilohertz, the one or more invalid SSB candidate positions include positions 8 and 9. When the FFP is 10 milliseconds, the idle length is 500 microseconds, and the SCS is 30 kilohertz, the one or more invalid SSB candidate positions include positions 8 and 9.

In some implementations, the method includes limiting the discovery reference signal (DRS) window length based at least in part on the FFP when the FFP is 5 milliseconds or 10 milliseconds. The DRS window length may be limited by configuring a parameter DiscoveryBurst-WindowLength-r16. The method may include determining that the SCS is 30 kilohertz and determining the parameter DiscoveryBurst-WindowLength-r16 to be 2 milliseconds in response to determining the SCS is 30 kilohertz. In some other implementations, the method may include determining that the SCS is 15 kilohertz and determining the parameter DiscoveryBurst-WindowLength-r16 to be 4 milliseconds in response to determining the SCS is 15 kilohertz.

In some implementations, the method includes determining that an SSB position in a first eight SSB positions in each FFP are valid, wherein performing radio management of the UE using one or more SSB positions includes using one or more of the first eight SSB positions in each FFP. When the SCS is 15 kilohertz, determining a final two SSB positions out of a defined ten SSB positions in each FFP are invalid. When the SCS is 30 kilohertz, determining a final twelve SSB positions out of a defined twenty SSB positions in each FFP are invalid.

For the aforementioned methods, when the cell signal is a neighbor cell signal, the method may include determining the FFP of the neighbor cell signal to be the same as an FFP of a serving cell signal. Also for the aforementioned methods, the cell signal may be for 5G-New Radio (5G-NR) cellular communications.

Another innovative aspect of the subject matter described in this disclosure can be implemented in a user equipment (UE) for wireless communication. The UE includes one or more processors and a memory coupled to the one or more processors and storing instructions that, when executed by the one or more processors, cause the UE to perform operations of any of the aforementioned methods.

Another innovative aspect of the subject matter described in this disclosure can be implemented in a non-transitory computer-readable memory. The computer-readable memory includes instructions that, when executed by one or more processors of a user equipment (UE), cause the UE to perform the operations of any of the aforementioned methods.

Another innovative aspect of the subject matter described in this disclosure can be implemented in a user equipment (UE) for wireless communication. The UE includes means for performing the operations of any of the aforementioned methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale. Also note that dashed lines or boxes may indicate optional steps or components of a method, system, or apparatus.

BRIEF DESCRIPTION OF THE DRAWINGS

FIG. 2A shows an example of a first 5G/NR frame.

FIG. 2B shows example downlink (DL) channels within a 5G/NR slot.

FIG. 2C shows an example of a second 5G/NR frame.

FIG. 2D shows example uplink (UL) channels within a 5G/NR slot.

FIG. 9 shows a table of example invalid synchronization signal block candidate positions based on a fixed frame period and a subcarrier spacing.

FIG. 12 shows a table of example invalid synchronization signal block candidate positions based on a fixed frame period, an idle length of an idle period, and a subcarrier spacing.

FIG. 14 shows a table of example invalid synchronization signal block candidate positions based on a fixed frame period and a subcarrier spacing.

Like reference numbers and designations in the various drawings indicate like elements.

DETAILED DESCRIPTION

Figure 1:
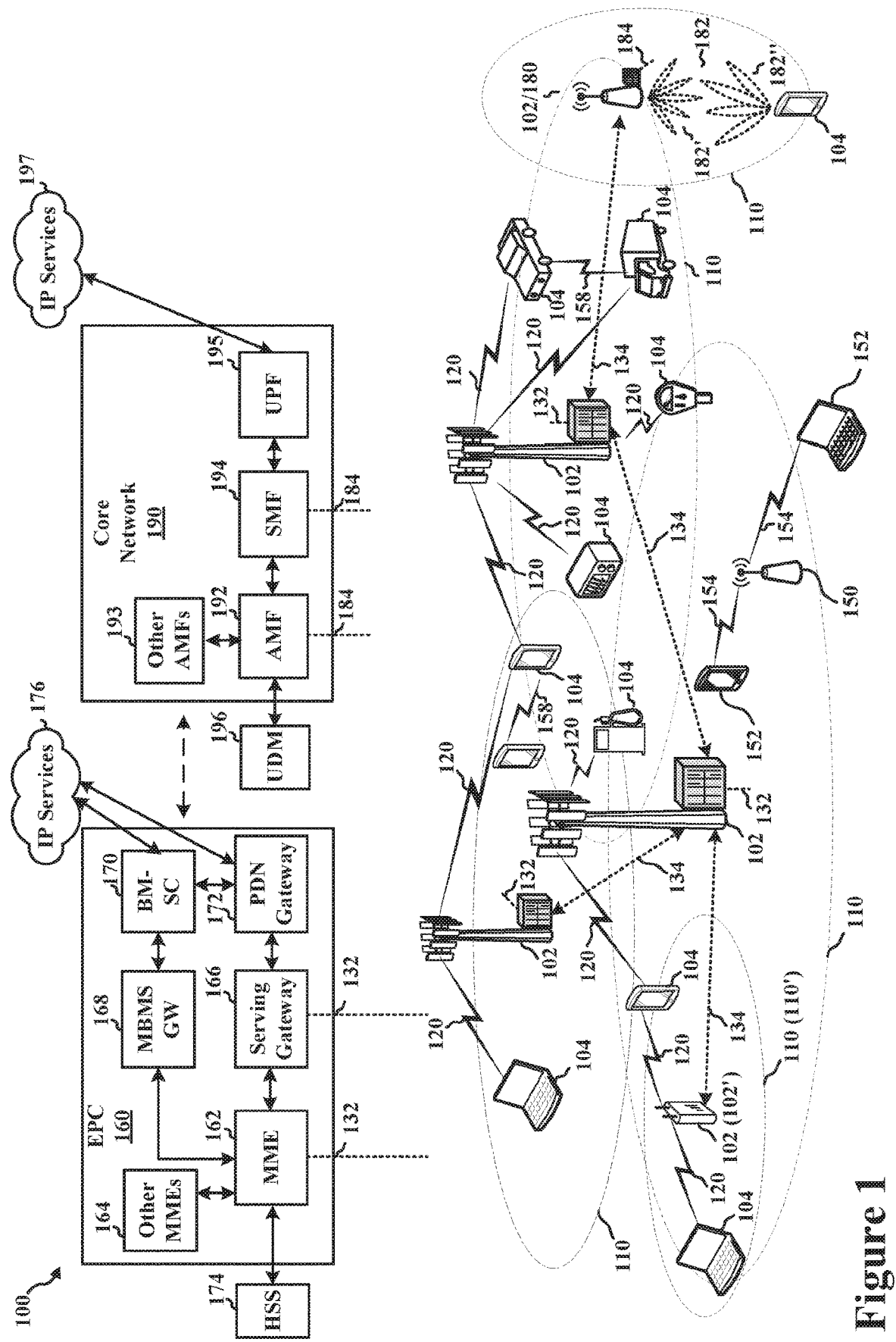
FIG. 1 shows a diagram illustrating an example wireless communications system and access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR), which may be referred to as 5G-NR, 5G/NR, and so on) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as the Si interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz. 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR m an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz 300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. In some cases, the 5G/NR frame structure may be FDD in which, for a particular set of subcarriers (carrier system bandwidth), slots within the set of subcarriers are dedicated for either DL or UL transmissions. In other cases, the 5G/NR frame structure may be TDD in which, for a particular set of subcarriers (carrier system bandwidth), slots within the set of subcarriers are dedicated for both DL and UL transmissions. In the examples shown in FIGS. 2A and 2C, the 5G/NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G/NR frame structure that is based on FDD.

Other wireless communication technologies may have a different frame structure or different channels. A frame may be divided into a number of equally sized subframes. For example, a frame having a duration of 10 milliseconds (ms) may be divided into 10 equally sized subframes each having a duration of 1 ms. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols per slot and $2\mu$ slots per subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz, and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 microseconds ($\rho$s).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100× is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI) Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
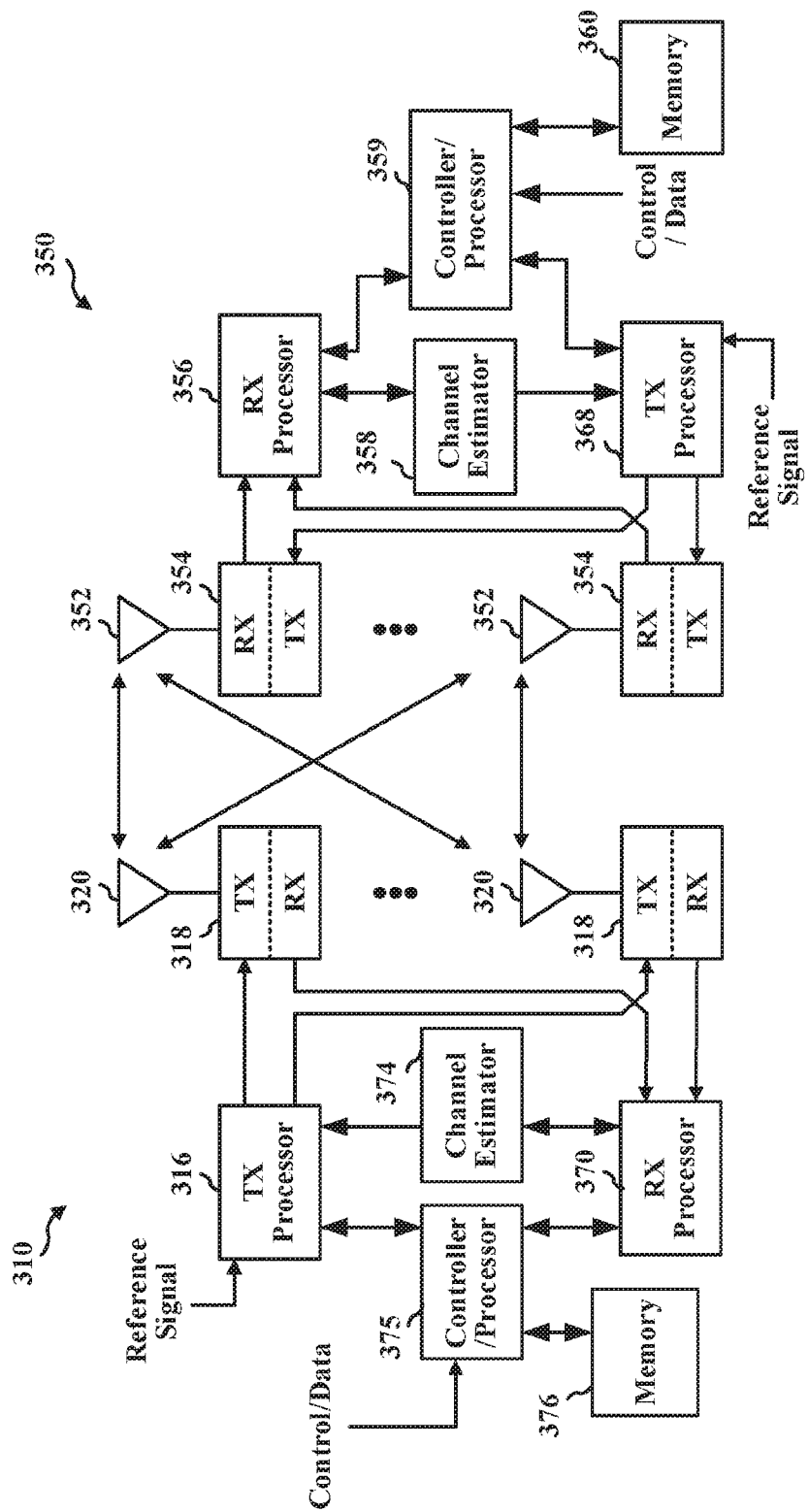
FIG. 3 shows a diagram illustrating an example base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT) The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification), RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. However, m actual implementations, many UEs have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

Some cellular communications systems (such as the network 100 in FIG. 1) are configured for Listen Before Talk (LBT) schemes to access a wireless channel for wireless communications. One option for LBT is a Frame Based Equipment (FBE) mode. In an FBE mode, a base station performs a clear channel assessment (CCA) at the end of every fixed frame period (FFP). If the CCA is successful (the base station does not sense that the wireless channel is occupied), the base station is able to transmit during the next FFP. If the CCA fails (the base station senses that the wireless channel is occupied, such as by another cellular device, a WLAN device, or so on), the base station assumes the channel is busy and waits until the end of the next FFP to perform another CCA.

Figure 4:
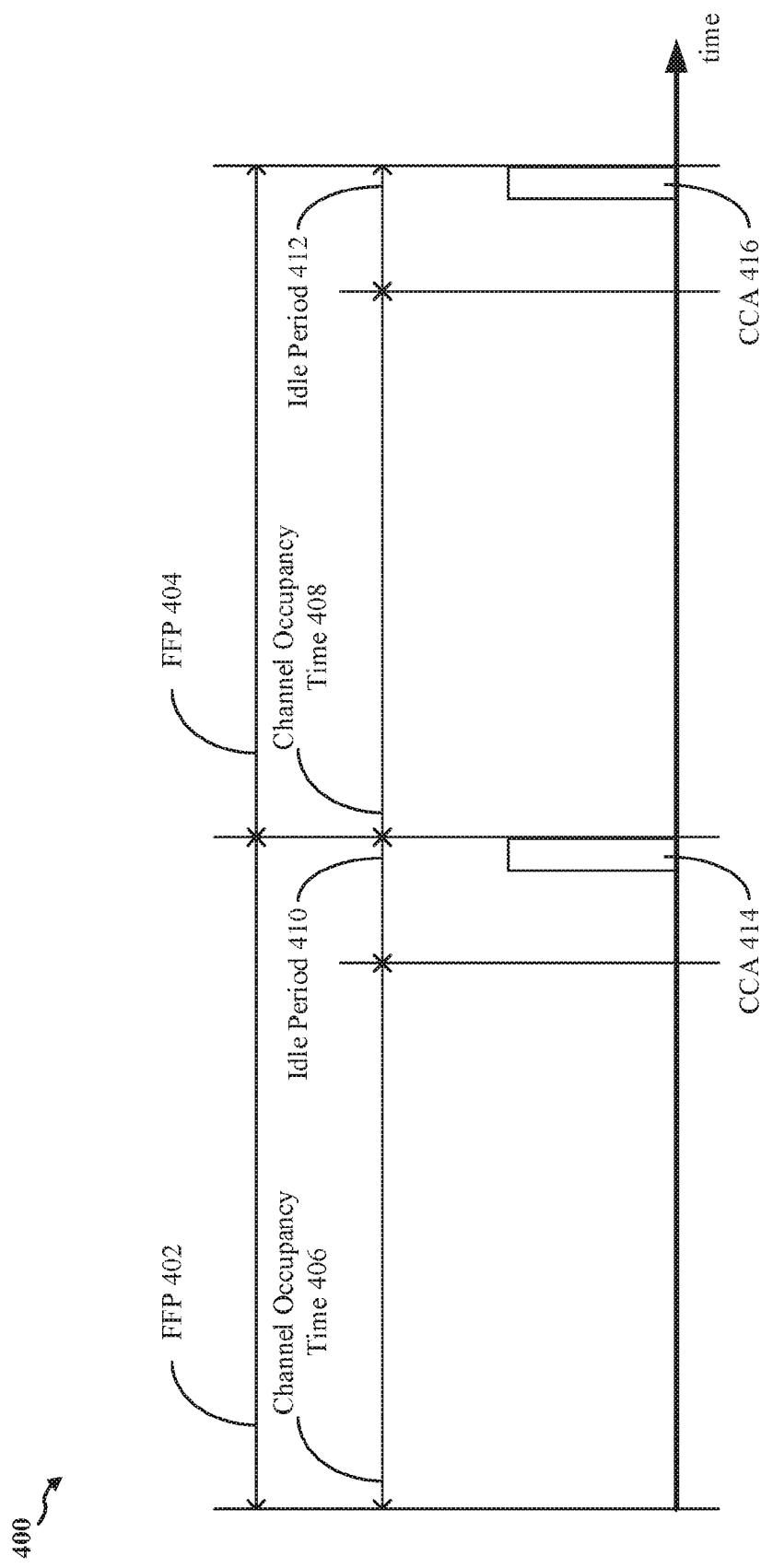
FIG. 4 shows an example tuning of fixed frame periods for communication over a wireless channel.

FIG. 4 shows an example timing 400 of FFPs 402 and 404 for communication over a wireless channel. FFP 402 includes a channel occupancy time (CoT) 406 during which the channel may be occupied by the UE or the base station. The FFP 402 also includes an idle period 410 during which the base station may perform LBT (such as CCA 414). FFP 404 includes a channel occupancy time (CoT) 408 during which the channel may be occupied by the UE or the base station. The FFP 404 also includes an idle period 412 during which the base station may perform LBT (such as CCA 416). The FFPs are fixed in length, with the length of FFP 402 equaling the length of FFP 404. If the CCA 414 is successful, the base station may occupy the channel (such as to transmit to one or more UEs) during the CoT 408 of the next FFP 404.

An FBE mode of operation is introduced in Release 16 of the NR-U standards specification by the 3GPP (referred to herein as the "standards specification"). As indicated in the standards specification, whether a network is operating in an FBE mode may be indicated in a Remaining Minimum System Information (RMSI) transmitted by a base station to one or more UEs. The FFP configuration may be included in a first system information block (SIB1) of the RMSI. In some other implementations, a serving cell's base station may signal the FFP configuration to a UE using UE-specific RRC signaling. The standards specification indicates that the length of the FFPs (including the idle period, as illustrated in FIG. 4) is configured to 1 millisecond (ms), 2 ms, 2.5 ms, 4 ms, 5 ms, or 10 ms Additionally, the idle period is to be at least a minimum idle length to allow a base station to perform LBT. The standards specification indicates that the minimum idle length is the greater of five percent of the FFP or 100 microseconds Preceding a base station transmitting at the beginning of an FFP, the base station may perform a one shot LBT (such as during a 25 microsecond duration of a first symbol for the FFP).

To begin transmitting by the base station to a UE, the base station may transmit one or more synchronization signal blocks (SSBs) subsequent to the one shot LBT. The UE uses the SSBs to perform radio management (such as PDSCH rate matching, radio link monitoring or measurement (RLM), or radio resource management (RRM)). In some implementations, the base station transmits an SSB burst (including a plurality of consecutive SSBs, such as 4 consecutive or 8 consecutive SSBs).

Figure 5:
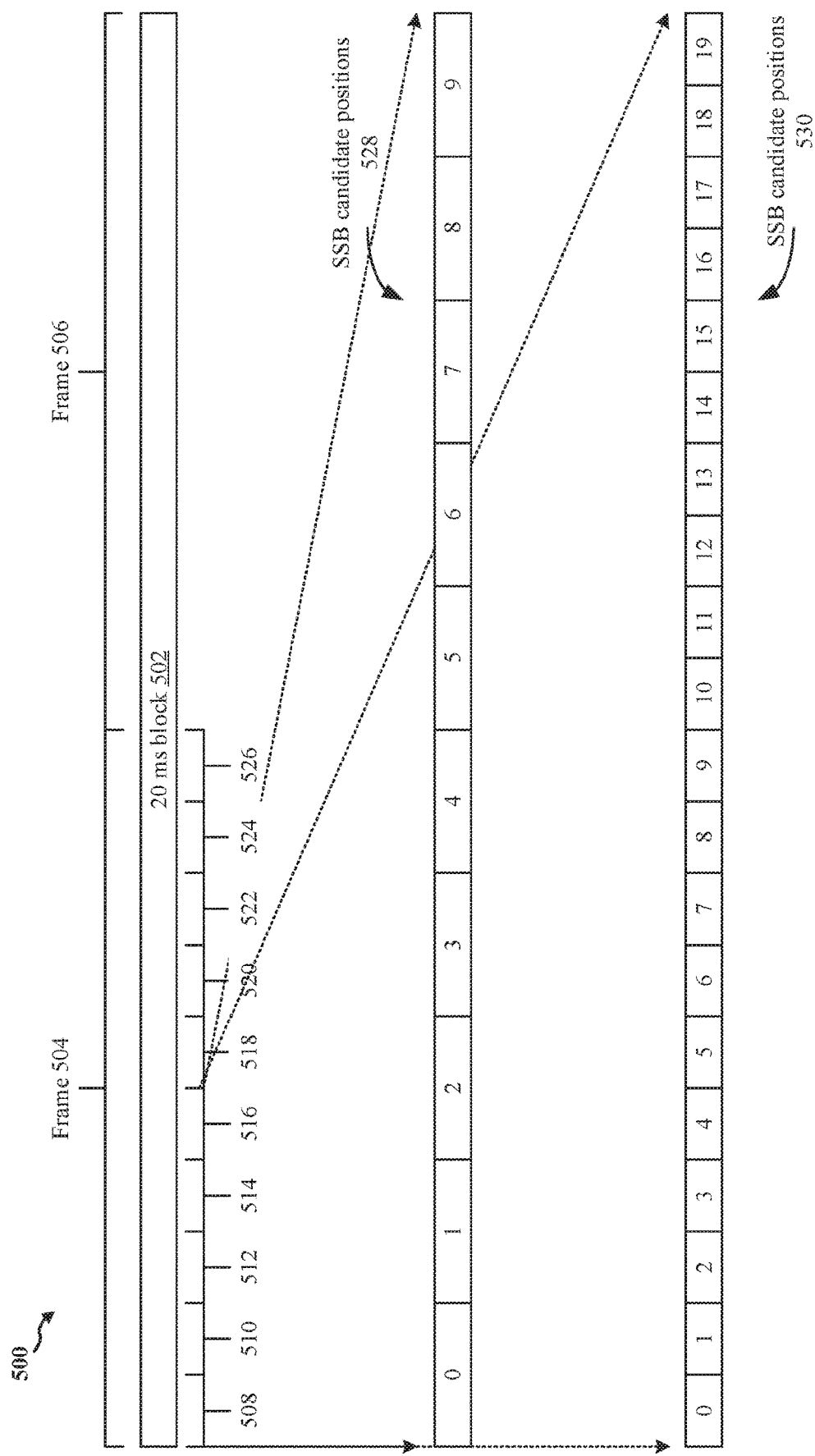
FIG. 5 shows an example timing of positions for synchronization signal blocks in one or more frames for different subcarrier spacings.

FIG. 5 shows an example timing 500 of positions for SSBs in one or more frames for different subcarrier spacings. A subcarrier spacing (SCS) indicates a duration between OFDM symbols and thus indicates a number of SSB positions that may exist during a 10 ms frame. The SCS may be 15 kilohertz (kHz) or 30 kHz, 20 ms object 502 includes two 10 ms frames 504 and 506. Each 10 ms frame includes ten 1 ms subframes (such as subframes 508-526 for frame 504). When the SCS is 15 kHz, up to two SSBs can be transmitted during a subframe (with each 1 ms subframe including 14 symbols). In this manner, each subframe includes two candidate SSB positions.

For legacy systems (such as LTE) in a load based equipment (LBE) mode of an LBT scheme, SSBs may be transmitted during the first four subframes (the first 4 ms) of every other frame's first half (such as during subframes 508-514 of frame 504). In this manner, the maximum SSB burst may be 8 SSBs since the first 4 ms includes 8 consecutive candidate SSB positions. For 5G systems, SSBs may also be transmitted during the last subframe (the last 1 ms) of the frame half (such as during subframe 516). In this manner, the maximum length SSB burst of 8 SSBs may span subframes 508-514 or subframes 510-516. Allowing use of the last 1 ms of a frame half for the SSB burst allows for the base station to use more time if needed to perform LBT preceding the SSB burst. In this manner, frame 504 includes 10 candidate SSB positions (two for subframe 508, two for subframe 510, two for subframe 512, two for subframe 514, and two for subframe 516). SSB candidate positions 528 shows the ten candidate positions 0-9 associated with the first five subframes 508-516 when the SCS is 15 kHz.

When the SCS is 30 kHz, up to four SSBs can be transmitted during a subframe (with each half of a subframe including 14 symbols). In this manner, each subframe includes four candidate SSB positions. For 5G systems that allow SSBs to be transmitted during the first five subframes of every other frame (such as during subframes 508-516), the first five subframes include 20 candidate SSB positions. SSB candidate positions 530 shows the twenty candidate positions 0-19 associated with the first five subframes 508-516 when the SCS is 30 kHz. SSB candidate positions may also be referred to as candidate SSB positions.

When the network is in an FBE mode, a base station may not be able to transmit the SSBs during certain times of an FFP (such as during one or more of the SSB candidate positions 528 when the SCS is 15 kHz or during one or more of the SSB candidate positions 530 when the SCS is 30 kHz). For example, an SSB position that does not begin an FFP may not begin an SSB burst. In another example, an SSB position that at least partially overlaps an idle period may not be used to transmit an SSB.

Figure 6:
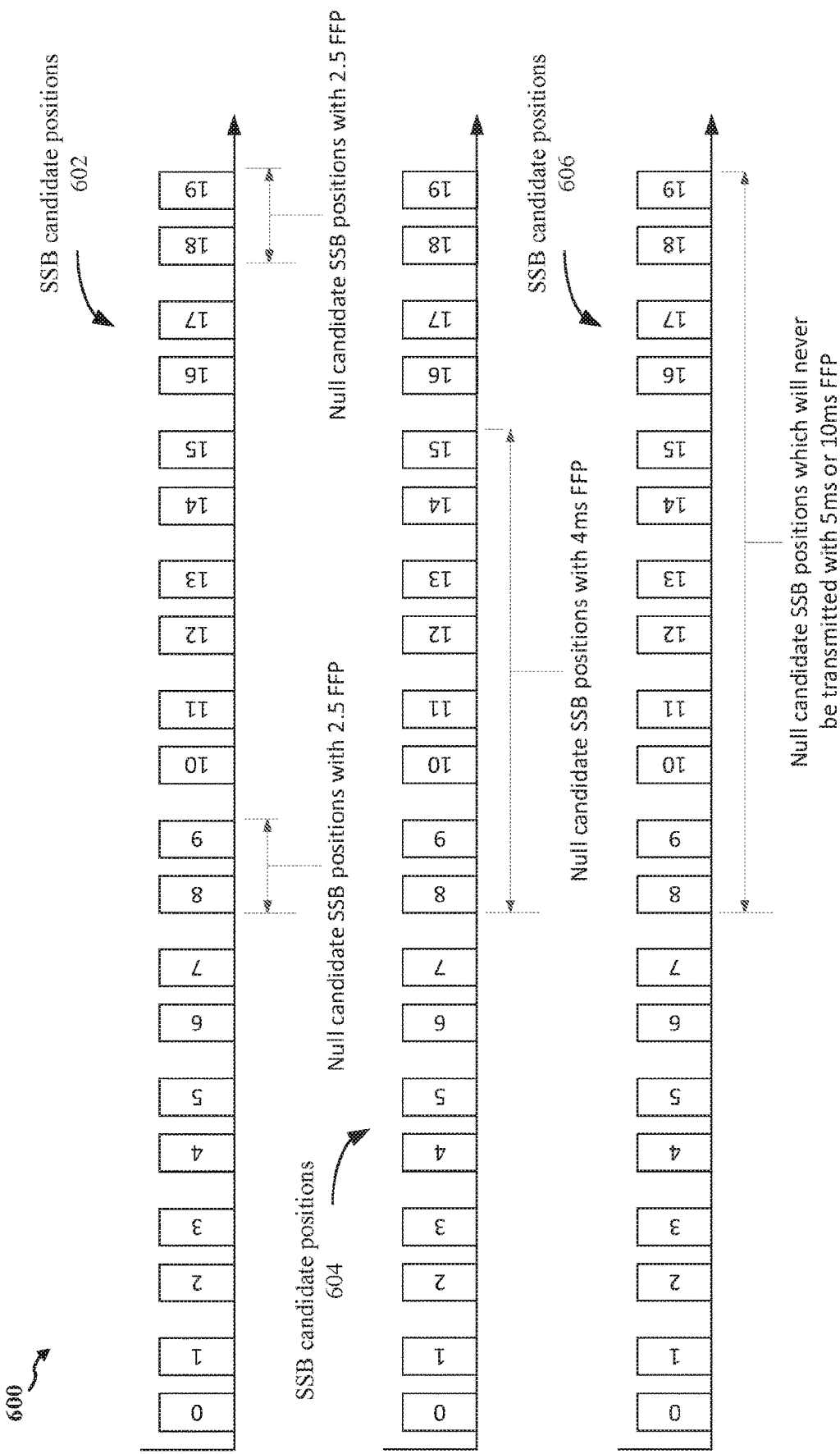
FIG. 6 shows example sequences of candidate synchronization signal block positions for different fixed frame periods and a subcarrier spacing of 30 kilohertz.

FIG. 6 shows example sequences 600 of candidate SSB positions for different FFPs and an SCS of 30 kilohertz. Each of the SSB candidate positions 602-606 shows SSB positions 0-19. SSB candidate positions 602 is associated with an FFP of 2.5 ms, SSB candidate positions 604 is associated with an FFP of 4 ms, and SSB candidate positions 606 is associated with an FFP of 5 ms.

For an SCS of 30 kilohertz, each 1 ms subframe includes 4 candidate SSB positions. Referring to SSB candidate positions 602 with the FFP equaling 2.5 ms, a first FFP includes positions 0-9 and a second FFP includes positions 10-19. If an SSB burst is transmitted at a beginning of an FFP, and the maximum SSB burst is 8 SSBs, the first 8 SSBs of an FFP may be valid candidate SSB positions for including an SSB. For example, the first FFP includes valid candidate SSB positions 0-8, and the second FFP includes valid candidate SSB positions 10-17. In this manner, SSB candidate positions 8 and 9 of the first FFP and SSB candidate positions 18 and 19 of the second FFP may not include an SSB. Referring to SSB candidate positions 604 with the FFP equaling 4 ms, a first FFP includes positions 0-15, and positions 16-19 are included in a second FFP. The first 8 SSBs of an FFP may be valid candidate SSB positions for including an SSB. Thus, the first FFP includes valid candidate SSB positions 0-7, and the second FFP includes valid candidate SSB positions 16-19. In this manner, SSB candidate positions 8-15 of the first FFP may not include an SSB. Referring to SSB candidate positions 606 with the FFP equaling 5 ms, a first FFP includes positions 0-19. The first 8 SSBs of the first FFP may be valid candidate SSB positions for including an SSB. Thus, the first FFP includes valid candidate SSB positions 0-7. In this manner, SSB candidate positions 8-19 of the first FFP may not include an SSB. An SSB candidate position that is not to include an SSB may be called an invalid SSB candidate position or a null SSB candidate position.

A base station may also be configured to transmit an SSB burst outside of the first 5 ms of every other frame (such as during the second half of frame 504 or during the first half or the second half of the frame 506 in FIG. 5). For example, a base station may be configured to transmit an SSB burst during subframes 518-526 (during the second 5 ms of the 20 ms block 502). Determining the valid SSB candidate positions is similar to as shown in FIG. 6 if the FFP is 2.5 ms, 5 ms, or 10 ms (since those numbers divide evenly into 10 ms). Otherwise, the valid SSB candidate positions when the FFP is 4 ms may be determined as shown in FIG. 7.

Figure 7:
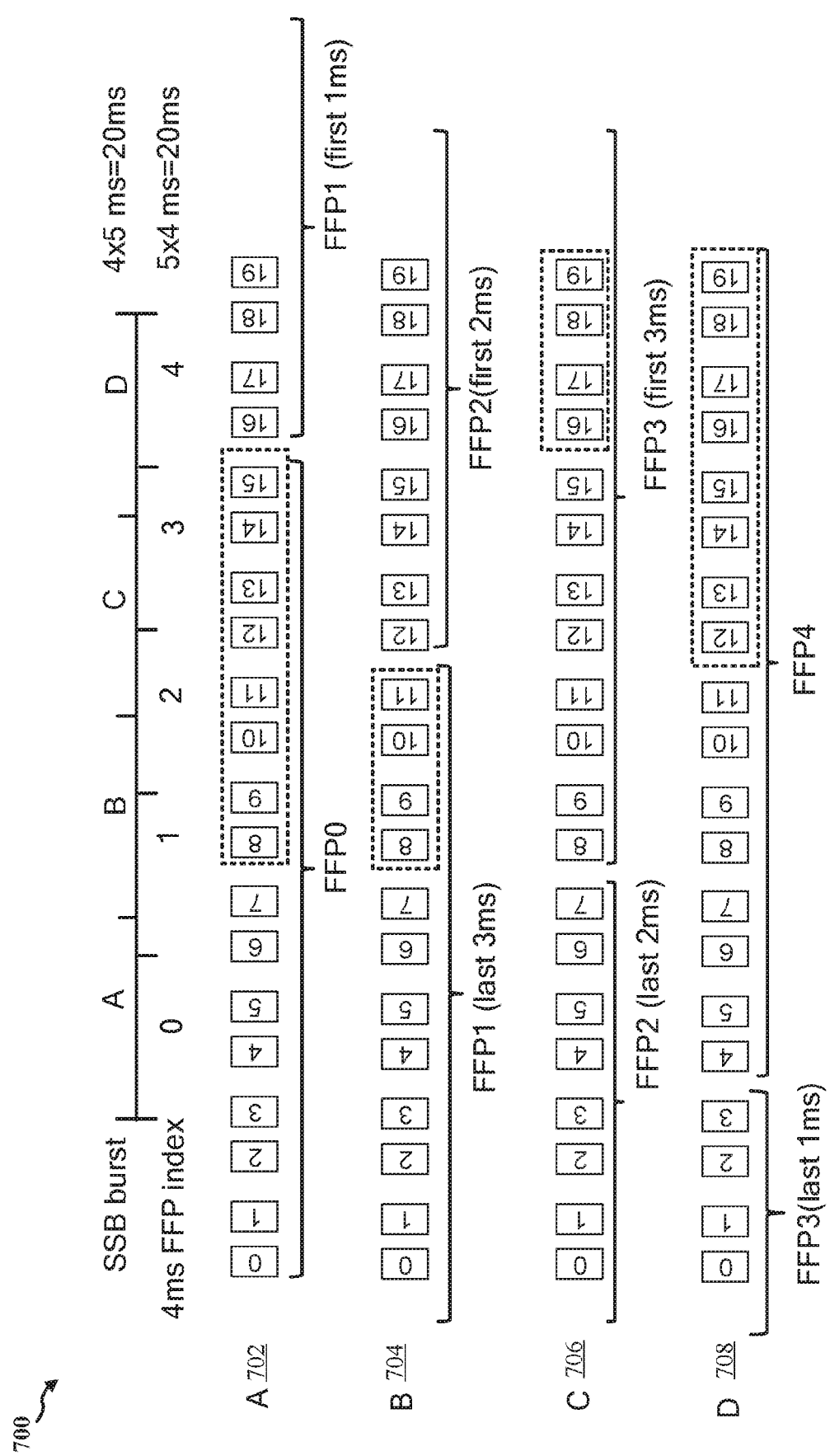
FIG. 7 shows example sequences of candidate synchronization signal block positions for a fixed frame period of 4 milliseconds and for different half frames of a 20 millisecond block including two frames.

FIG. 7 shows example sequences 700 of candidate SSB positions for an FFP of 4 ms and for different half frames of a 20 ms block including two frames (such as block 502 including frames 504 and 506 in FIG. 5). For a 20 ms block and an FFP of 4 ms, the block includes 5 FFPs (indicated by the 4 ms FFP index 0, 1, 2, 3, 4). An SSB burst being transmitted in a first half of a first frame (the first 5 ms of a 20 ms block) is indicated by half frame A. An SSB burst being transmitted in a second half of a first frame (the second 5 ms of a 20 ms block) is indicated by half frame B. An SSB burst being transmitted in a first half of a second frame (the third 5 ms of a 20 ms block) is indicated by half frame C. An SSB burst being transmitted in a second half of a second frame (the fourth 5 ms of a 20 ms block) is indicated by half frame D. As shown in FIG. 7, the length of the four half frames equals the length of the five FFP indexes (20 ms).

Half frame A 702 indicates the 20 candidate SSB positions of the first 5 ms of the 20 ms block when the SCS is 30 kHz. The beginning of the half frame A 702 aligns with the beginning of the first FFP (FFP0). Thus, if the base station is to transmit an SSB burst during the first 5 ms of the 20 ms block (during half frame A 702), the first 8 SSB positions of the half frame A 702 may be considered valid (since the first 8 SSB positions of FFP0 align with the first 8 SSB positions of the half frame A 702). For the FFP equal to 4 ms, each FFP includes 16 SSB candidate positions. Thus, for half frame A 702, the remaining SSB positions in FFP0 (after the first 8 positions) are positions 8-15, and positions 8-15 may be considered invalid SSB candidate positions (with an SSB not transmitted on any of the remaining SSB positions). The next FFP (FFP1) begins with SSB candidate position 16 of the half frame A 702, and SSB positions 16-19 may be considered valid since part of the first 8 SSB candidate positions of FFP1.

Half frame B 704 indicates the 20 candidate SSB positions of the second 5 ms of the 20 ms block when the SCS is 30 kHz. The beginning of the half frame B 704 aligns with the last 3 ms of FFP1. Thus, if the base station is to transmit an SSB burst during the second 5 ms of the 20 ms block (during half frame B 704), the first 8 SSB positions of the half frame B 704 may be considered valid (since 8 SSB positions of FFP1 align with the first 8 SSB positions of the half frame B 704) The remaining SSB positions in FFP1 (after the first 8 positions) are positions 8-11, and positions 8-11 may be considered invalid SSB candidate positions (with an SSB not transmitted on any of the remaining SSB positions). The next FFP (FFP2) begins with SSB candidate position 12 of the half frame B 704, and SSB positions 12-19 may be considered valid since they are the first 8 SSB candidate positions of FFP2.

Half frame C 706 indicates the 20 candidate SSB positions of the third 5 ms of the 20 ms block when the SCS is 30 kHz. The beginning of the half frame C 706 aligns with the last 2 ms of FFP2. Thus, if the base station is to transmit an SSB burst during the third 5 ms of the 20 ms block (during half frame C 706), the first 8 SSB positions of the half frame C 706 may be considered valid (since 8 SSB positions of FFP2 align with the first 8 SSB positions of the half frame C 706). No remaining SSB positions in FFP2 (after the first 8 positions) exist, and the next FFP (FFP3) begins with SSB candidate position 8 of the half frame C 706. Thus, SSB positions 8-15 may be considered valid since they are the first 8 SSB candidate positions of FFP3. The remaining SSB positions in FFP3 (after the first 8 positions) are positions 16-19, and positions 16-19 may be considered invalid SSB candidate positions (with an SSB not transmitted on any of the remaining SSB positions).

Half frame D 708 indicates the 20 candidate SSB positions of the fourth 5 ms of the 20 ms block when the SCS is 30 kHz. The beginning of the half frame D 708 aligns with the last 1 ms of FFP3. Thus, if the base station is to transmit an SSB burst during the fourth 5 ms of the 20 ms block (during half frame D 708), the first 4 SSB positions of the half frame D 708 may be considered valid (since the last 4 SSB positions of FFP3 align with the first 4 SSB positions of the half frame D 708). The next FFP (FFP4) begins with SSB candidate position 4 of the half frame D 708. Thus, SSB positions 4-11 may be considered valid since they are the first 8 SSB candidate positions of FFP4. The remaining SSB positions in FFP4 (after the first 8 positions) are positions 12-19, and positions 12-19 may be considered invalid SSB candidate positions (with an SSB not transmitted on any of the remaining SSB positions).

As illustrated in FIG. 6 and FIG. 7, one or more SSB positions in a latter part of an FFP may be considered invalid, with the base station not transmitting an SSB during the one or more SSB positions. In addition, one or more SSB positions in a half frame may at least partially overlap an idle period of an FFP, and the base station does not transmit an SSB during an SSB position that overlaps an idle period of an FFP (and the SSB position may be considered an invalid SSB candidate position).

However, a UE listens for an SSB during invalid SSB candidate positions even though an SSB is not transmitted by the base station during those positions. As a result, the UE may attempt to perform radio management (such as rate matching, RLM, or RRM) based on one or more invalid SSB candidate positions. Use of invalid SSB candidate positions for radio management may negatively impact the quality of a connection between the UE and the base station (such as by affecting rate matching, link measurement, and so on). In addition, the UE listening for an SSB during an invalid SSB candidate position prevents such time from otherwise being used. For example, such time used listening for non-incoming SSBs is not used for transmitting on the PDSCH (thus limiting the throughput).

In some implementations, the UE is configured to determine the one or more invalid SSB candidate positions and perform radio management based at least in part on the one or more invalid SSB candidate positions. For example, the UE may perform radio management using one or more SSB positions exclusive of the one or more invalid SSB candidate positions (thus preventing the one or more invalid SSB candidate positions from being used). In this manner, the UE may limit listening for SSBs to valid SSB candidate positions. In some implementations, the UE may use the time including the one or more invalid SSB candidate positions for communication via the PDSCH (instead of listening for an SSB to perform radio management, such as rate matching, RLM, or RRM).

Figure 8:
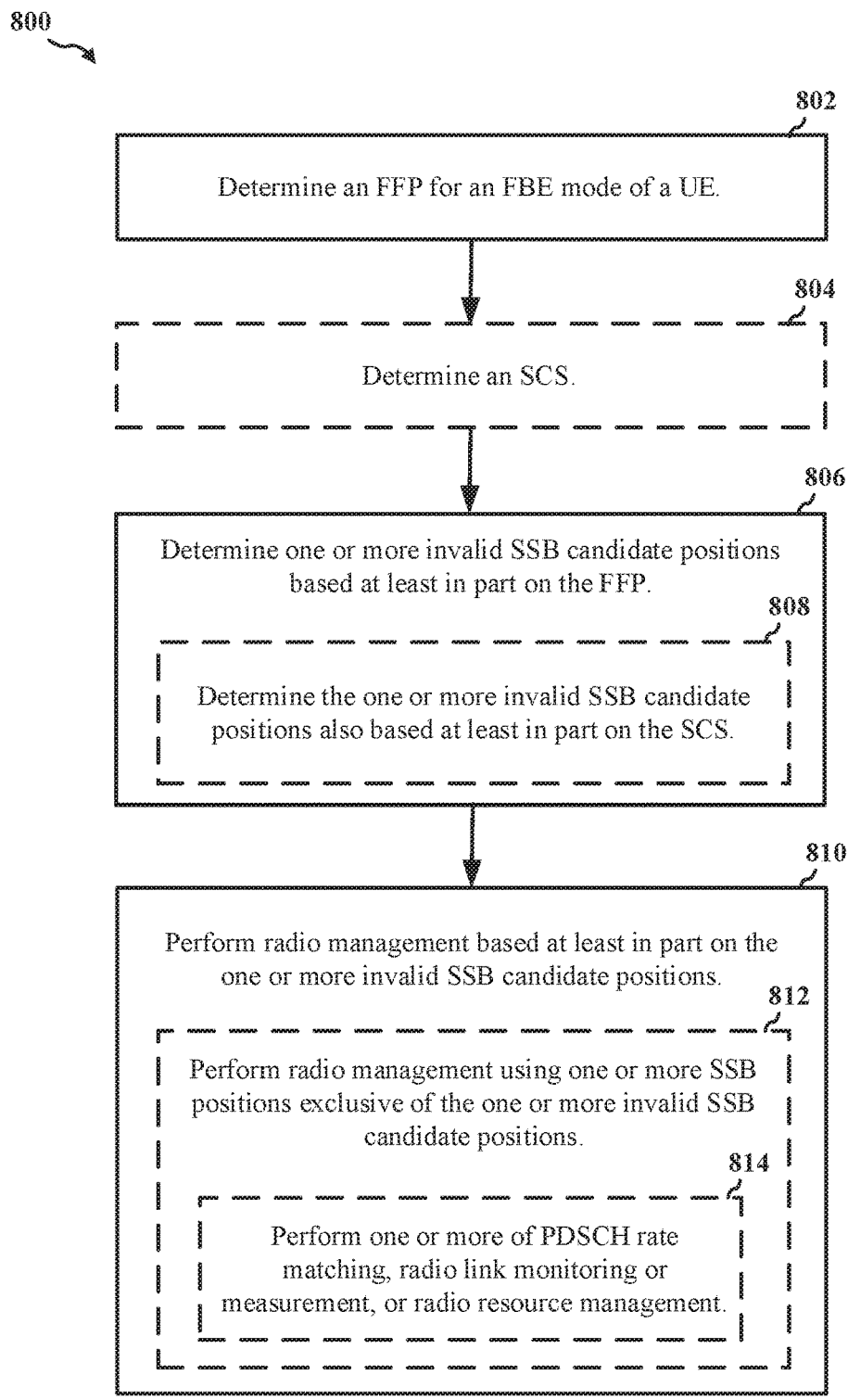
FIG. 8 shows a flowchart depicting an example operation for a UE to perform radio management based at least in part on one or more invalid synchronization signal block candidate positions in a half frame.

FIG. 8 shows a flowchart depicting an example operation 800 for a UE to perform radio management based at least in part on one or more invalid SSB candidate positions in a half frame. At 802, the UE determines an FFP (with the UE operating in an FBE mode). For example, the UE may determine from an SIB1 from a serving base station that the FFP is one of 1 ms, 2 ms, 2.5 ms, 4 ms, 5 ms, or 10 ms. If the FFP is not configured or the UE is otherwise unable to determine the FFP, the UE may assume that the FFP is 5 ms.

In some implementations, the UE may determine an SCS (804). For example, the UE may determine if the SCS is 15 kHz or 30 kHz. If the SCS is 15 kHz, each half frame may include 10 SSB positions. If the SCS is 30 kHz, each half frame may include 20 SSB positions.

At 806, the UE determines one or more invalid SSB candidate positions based at least in part on the FFP. In some implementations, the invalid SSB candidate positions may be predefined based on the FFP and the half frame during which an SSB burst is to be transmitted. For example, the invalid SSB candidate positions may be indicated in a standard from the 3GPP based at least m part on the FFP, and such positions may be programmed into the UE (such as in a look-up table storing invalid SSB candidate positions based at least in part on the FFP).

In some implementations, determining the one or more invalid SSB candidate positions is also based in part on the SCS (808). For example, the look-up table and/or standard from the 3GPP may indicate invalid SSB candidate positions also based at least in part on the SCS.

FIG. 9 shows a table 900 of example invalid SSB candidate positions based on an FFP and an SCS In some implementations, the UE may store a version of the table 900 to determine one or more invalid SSB candidate positions. The SSB positions including the invalid SSB candidate positions are in a half frame (5 ms) of a 20 ms block during which an SSB burst is to be transmitted. If the SCS is 15 kHz, the ten defined SBS positions are 0-9 of the designated half frame (such as half frame A, B, C, or D in FIG. 7) If the SCS is 30 kHz, the twenty defined SBS positions are 0-19 of the designated half frame.

Referring to the table 900, if the FFP is 1 ms or 2 ms, no invalid SSB candidate positions are determined based on the table 900. If the FFP is 2.5 ms and the SCS is 30 kHz, the invalid SSB candidate positions (referred to as null SSB positions) are positions 8, 9, 18, and 19. If the FFP is 4 ms and the SCS is 30 kHz, the invalid SSB candidate positions are positions 9-15 if for a first half frame (first 5 ms), positions 8-11 if for a second half frame (second 5 ms), positions 16-19 if for a third half frame (third 5 ms), or positions 12-19 if for a fourth half frame (fourth 5 ms). If the FFP is 5 ms and the SCS is 30 kHz, the invalid SSB candidate positions are positions 8-19. If the FFP is 5 ms and the SCS is 15 kHz, the invalid SSB candidate positions are positions 8 and 9. If the FFP is 10 ms and the SCS is 30 kHz, the invalid SSB candidate positions are positions 8-19. If the FFP is 10 ms and the SCS is 15 kHz, the invalid SSB candidate positions are positions 8 and 9. In this manner, SSB positions later in an FFP may be considered invalid.

Referring back to FIG. 8, the U E performs radio management based at least in part on the one or more invalid SSB candidate positions (810). In some implementations, the UE performs radio management using one or more SSB positions exclusive of the one or more invalid SSB candidate positions (812). For example, referring back to FIG. 9, if the FFP is 5 ms, the UE may prevent SSB positions 8-19 of the half frame from being used for radio management. For example, the UE does not listen during SSB positions 8-19 for an SSB. Referring back to FIG. 8, in some implementations of radio management, the UE may perform one or more of PDSCH rate matching, radio link monitoring or measurement, or radio resource management (814).

In addition or alternative to determining one or more invalid SSB candidate positions, the UE may determine a first eight SSB positions of an FFP (such as for each FFP) to be valid SSB positions. In this manner, the UE may use the first eight SSB positions to perform radio management. For example, the UE may listen for an SSB during the eight SSB positions, and the UE may perform one or more of PDSCH rate matching, radio link monitoring or measurement, or radio resource management based on SSBs received during the eight SSB positions. In some implementations, if the SCS is 15 kHz, the UE may consider the final two SSB positions in each FFP as invalid. If the SCS is 30 kHz, the UE may consider the final twelve SSB positions in each FFP as invalid.

Alternative or in addition to predefining SSB positions as valid or invalid (such as through use of table 900 in FIG. 9), a window for SSB bursts may be adjusted. A discovery reference signal (DRS) transmission window duration is a maximum of 5 ms and is typically set to 5 ms. For example, when the duration is not known, the UE assumes the duration is 5 ms. In another example, performance requirements depending on DRS transmission window duration (such as RRM) may assume the duration is 5 ms. For the above examples, the DRS transmission window duration is set to a duration of 5 ms.

A periodicity of the DRS transmission window is the same as the periodicity for SSB bursts. Thus, a 5 ms DRS transmission window corresponds to a half frame during which an SSB burst may be transmitted. In this manner, a parameter DiscoveryBurst-WindowLength-r16 may be configured to a specific length to indicate an amount of time including the first 8 SSB positions of an FFP. For example, if the SCS is 30 kHz, the parameter DiscoveryBurst-WindowLength-r16 may be set to 2 ms since each ms includes four SSB candidate positions. If the SCS is 15 kHz, the parameter DiscoveryBurst-WindowLength-r16 may be set to 4 ms since each ms includes two SSB candidate positions. In this manner, the UE may listen for SSBs during the indicated time and perform radio management based on received SSBs during such time.

Figure 10:
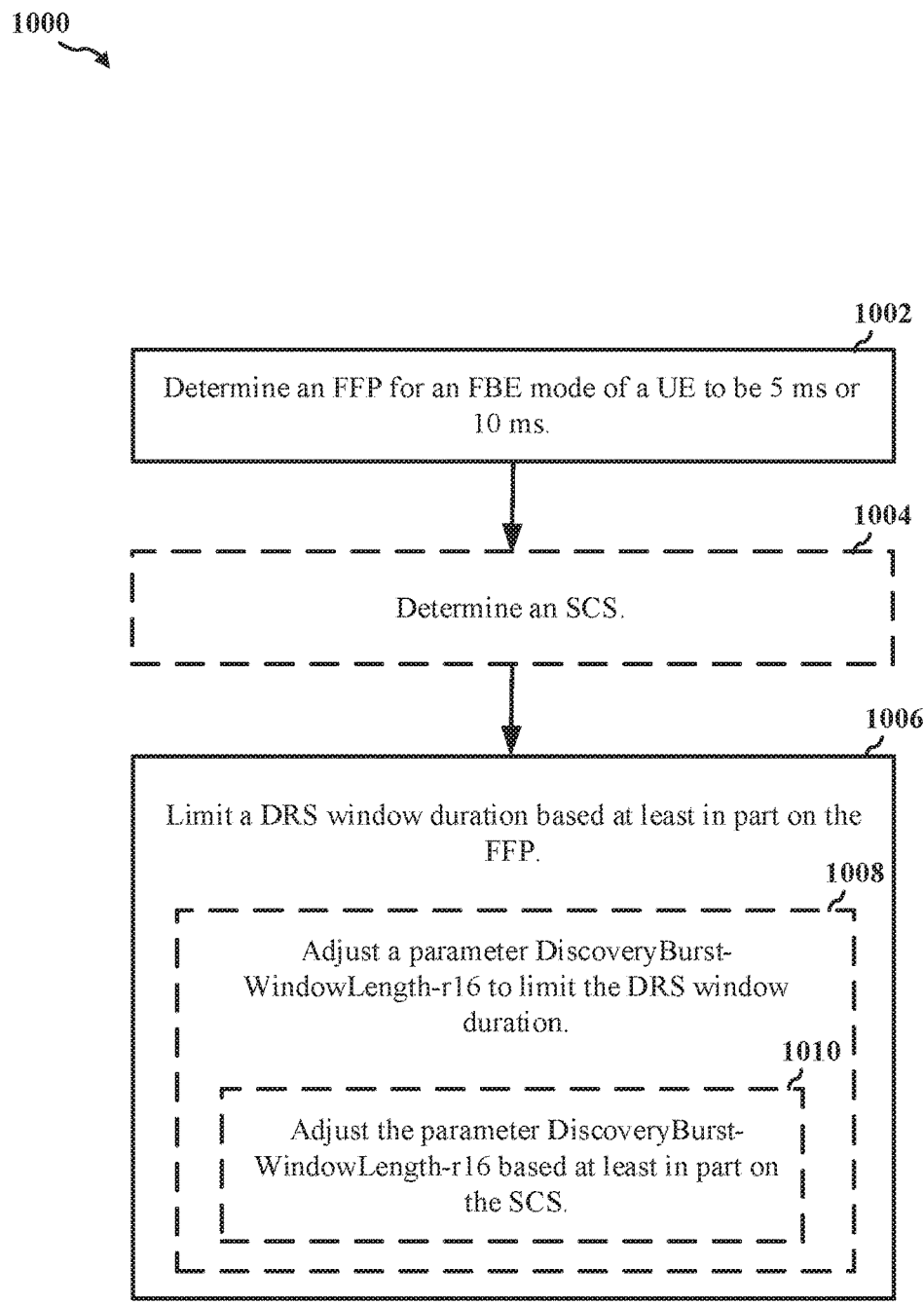
FIG. 10 shows a flowchart depicting an example operation for limiting a discovery reference signal window length based at least in part on a fixed frame period.

FIG. 10 shows a flowchart depicting an example operation 1000 for limiting a DRS window length based at least in part on an FFP. At 1002, the UE determines an FFP to be 5 ms or 10 ms. In some implementations, the UE may also determine an SCS (1004). At 1006, the UE limits a DRS window duration based at least in part on the FFP. In some implementations of limiting the DRS window duration, the parameter DiscoveryBurst-WindowLength-r16 may be adjusted (1008), and adjusting the parameter DiscoveryBurst-WindowLength-r16 may be based at least m part on the SCS (1010). For example, if the SCS is 30 kHz, the parameter DiscoveryBurst-WindowLength-r16 may be set to 2 ms. If the SCS is 15 kHz, the parameter DiscoveryBurst-WindowLength-r16 may be set to 4 ms. If the parameter DiscoveryBurst-WindowLength-r16 is not configured by a base station, the UE may assume that the parameter DiscoveryBurst-WmdowLength-r16 is 2 ms or 4 ms based at least in part on the SCS.

The examples in FIGS. 6-10 refer to one or more SSB positions in a latter part of an FFP possibly being invalid. As noted herein, an SSB position that at least partially overlaps an idle period at the end of an FFP may also be considered invalid. For example, the idle period is the greater of 5 percent of the FFP or 100 microseconds, and downlink and uplink transmissions are not allowed during the idle period. However, some SSB positions partially overlap the idle period based on the FFP and the SCS. For example, referring back to FIG. 6, for the FFP equal to 2.5 ms and the SCS equal to 30 kHz, SSB position 9 of the first FFP may partially overlap the idle period at the end of the FFP. In some implementations, determining one or more invalid SSB candidate positions is based at least in part on an idle period (such as the idle length of the idle period).

Figure 11:
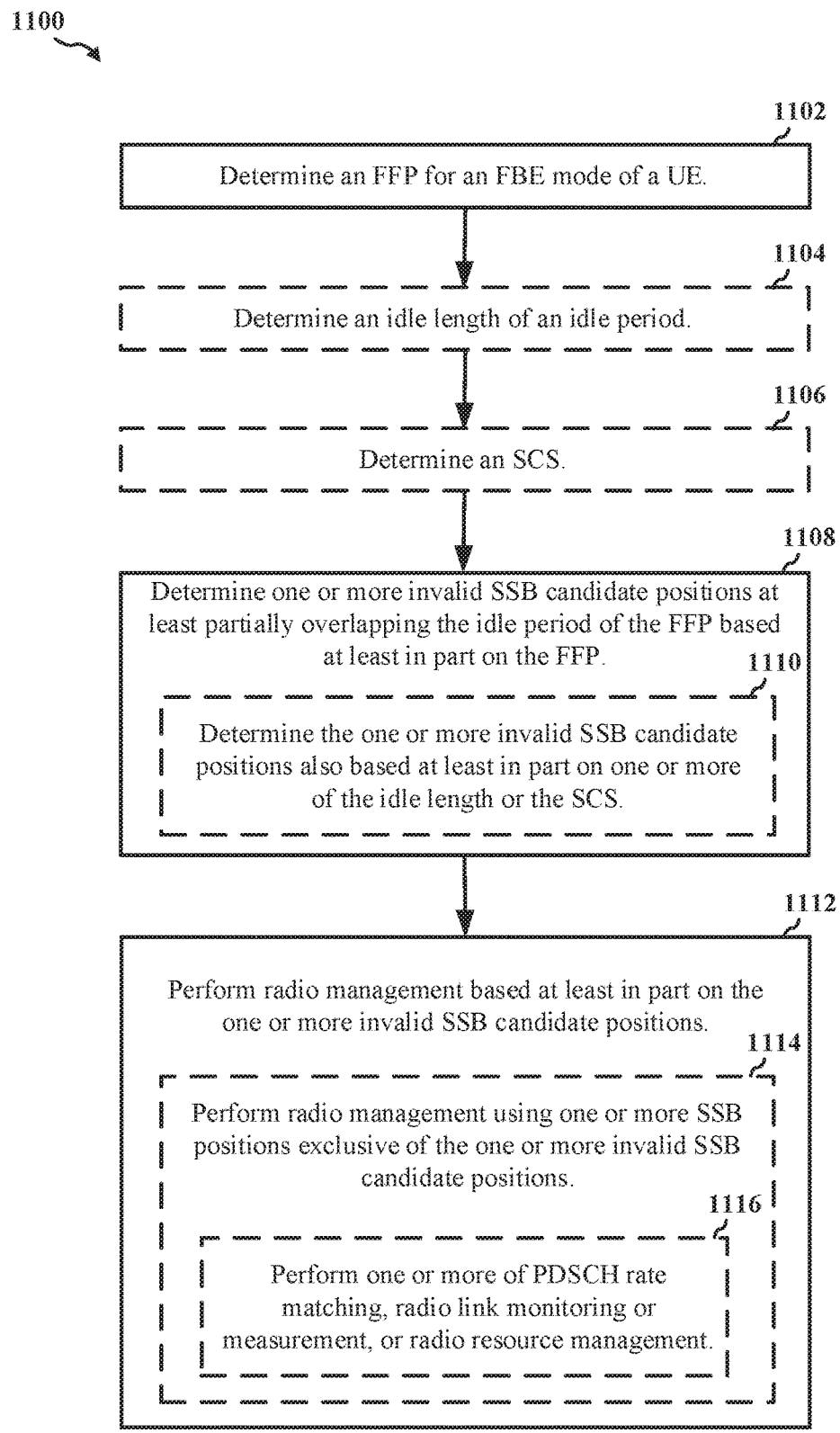
FIG. 11 shows a flowchart depicting an example operation for a UE to perform radio management based at least in part on one or more invalid synchronization signal block candidate positions at least partially overlapping an idle period of a fixed frame period.

FIG. 11 shows a flowchart depicting an example operation 1100 for a UE to perform radio management based at least in part on one or more invalid SSB candidate positions at least partially overlapping an idle period of an FFP. At 1102, the UE determines an FFP for an FBE mode. In some implementations, the UE may determine an idle length of the idle period (1104). For example, the idle length may be the greater of five percent of the FFP and 100 microseconds. In some further implementations, the UE may determine an SCS (1106). For example, the SCS may be determined to be 15 kHz or 30 kHz.

At 1108, the UE determines one or more invalid SSB candidate positions at least partially overlapping the idle period of the FFP based at least in part on the FFP. In some implementations, determining the one or more invalid SSB candidate positions is also based in part on one or more of the idle length or the SCS (1110). The invalid SSB candidate positions may be predefined based on the FFP and one or more of the idle length, the SCS, or the half frame during which an SSB burst is to be transmitted. For example, the invalid SSB candidate positions may be indicated in a standard from the 3GPP based at least m part on the FFP, and such positions may be programmed into the UE (such as in a look-up table storing invalid SSB candidate positions based at least in part on the FFP).

FIG. 12 shows a table 1200 of example invalid SSB candidate positions based on an FFP, an idle length of an idle period, and an SCS. The table may indicate the SSB positions that may possibly overlap an idle period for any FFP. The invalid SSB candidate positions may also be based on the half frame of a 20 ms block that includes the defined SSB positions (such as half frame A, B, C, or D as illustrated in FIG. 7). In some implementations, the UE may store a version of the table 1200 to determine one or more invalid SSB candidate positions. The SSB positions including the invalid SSB candidate positions are in a half frame (5 ms) of a 20 ms block during which an SSB burst is to be transmitted. If the SCS is 15 kHz, the ten defined SBS positions are 0-9 of the designated half frame (such as half frame A, B, C, or D in FIG. 7). If the SCS is 30 kHz, the twenty defined SBS positions are 0-19 of the designated half frame.

Referring to the table 1200, if the FFP is 1 ms, the idle length is 100 microseconds, and the SCS is 30 kHz, the invalid SSB candidate positions are positions 3, 7, 11, 15, and 19. If the FFP is 2 ms, the idle length is 100 microseconds, and the SCS is 30 kHz, the invalid SSB candidate positions are positions 7 and 15 for the first half frame (first 5 ms), positions 3, 11, and 19 for the second half frame (second 5 ms), positions 7 and 15 for the third half frame (third 5 ms), and positions 3, 11, and 19 for the fourth half frame (fourth 5 ms). If the FFP is 2.5 ms, the idle length is 125 microseconds, and the SCS is 30 kHz, the invalid SSB candidate positions are positions 9 and 19. If the FFP is 4 ins, the idle length is 200 microseconds, and the SCS is 30 kHz, the invalid SSB candidate positions are position 15 for the first half frame (first 5 ms), position 11 for the second half frame (second 5 ms), position 7 for the third half frame (third 5 ms), and positions 3 and 19 for the fourth half frame (fourth 5 ms). If the FFP is 4 ms, the idle length is 200 microseconds, and the SCS is 15 kHz, the invalid SSB candidate positions are position 7 for the first half frame (first 5 ms), position 5 for the second half frame (second 5 ms), position 3 for the third half frame (third 5 ms), and positions 1 and 9 for the fourth half frame (fourth 5 ms). If the FFP is 5 ms, the idle length is 250 microseconds, and the SCS is 30 kHz, the invalid SSB candidate position is position 19. If the FFP is 5 ms, the idle length is 250 microseconds, and the SCS is 15 kHz, the invalid SSB candidate position is position 9. In the table 1200, no invalid SSB candidate positions are indicated for FFPs between 1 ms and 2.5 ms and an SCS of 15 kHz (since no SSB positions could potentially overlap an idle period with an idle length of 100 microseconds when the SCS is 15 kHz) Additionally, no invalid SSB candidate positions are indicated for an FFP of 10 ms (since the FFP would be the same length as a frame and the SSB positions of each half frame would be before the idle period).

Referring back to FIG. 11, the UE performs radio management based at least in part on the one or more invalid SSB candidate positions (1112). In some implementations, the UE performs radio management using one or more SSB positions exclusive of the one or more invalid SSB candidate positions (1114). For example, referring back to FIG. 12, if the FFP is 5 ms and the SCS is 30 kHz, the UE may prevent SSB position 19 of a half frame from being used for radio management. For example, the UE does not listen during SSB position 19 for an SSB. Referring back to FIG. 11, in some implementations of radio management, the UE may perform one or more of PDSCH rate matching, radio link monitoring or measurement, or radio resource management (1116).

In addition or alternative to one or more SSB positions being predefined as invalid, the UE may measure SSB positions and the FFP to determine if an SSB may partially overlap an idle period. In this manner, the UE may determine that an SSB position at least partially overlaps the idle period, and the UE may determine that the SSB position is included in the one or more invalid SSB candidate positions based at least in part on determining that the SSB position at least partially overlaps the idle period.

As noted above, in some examples, SSB positions that are in the latter part of an FFP may be considered invalid, and in some other examples, SSB positions that may at least partially overlap an idle period of an FFP may be considered invalid. In some implementations, a UE may determine one or more invalid SSB candidate positions based on either an SSB position being in a latter part of an FFP or the SSB position possibly overlapping an idle period of an FFP.

Figure 13:
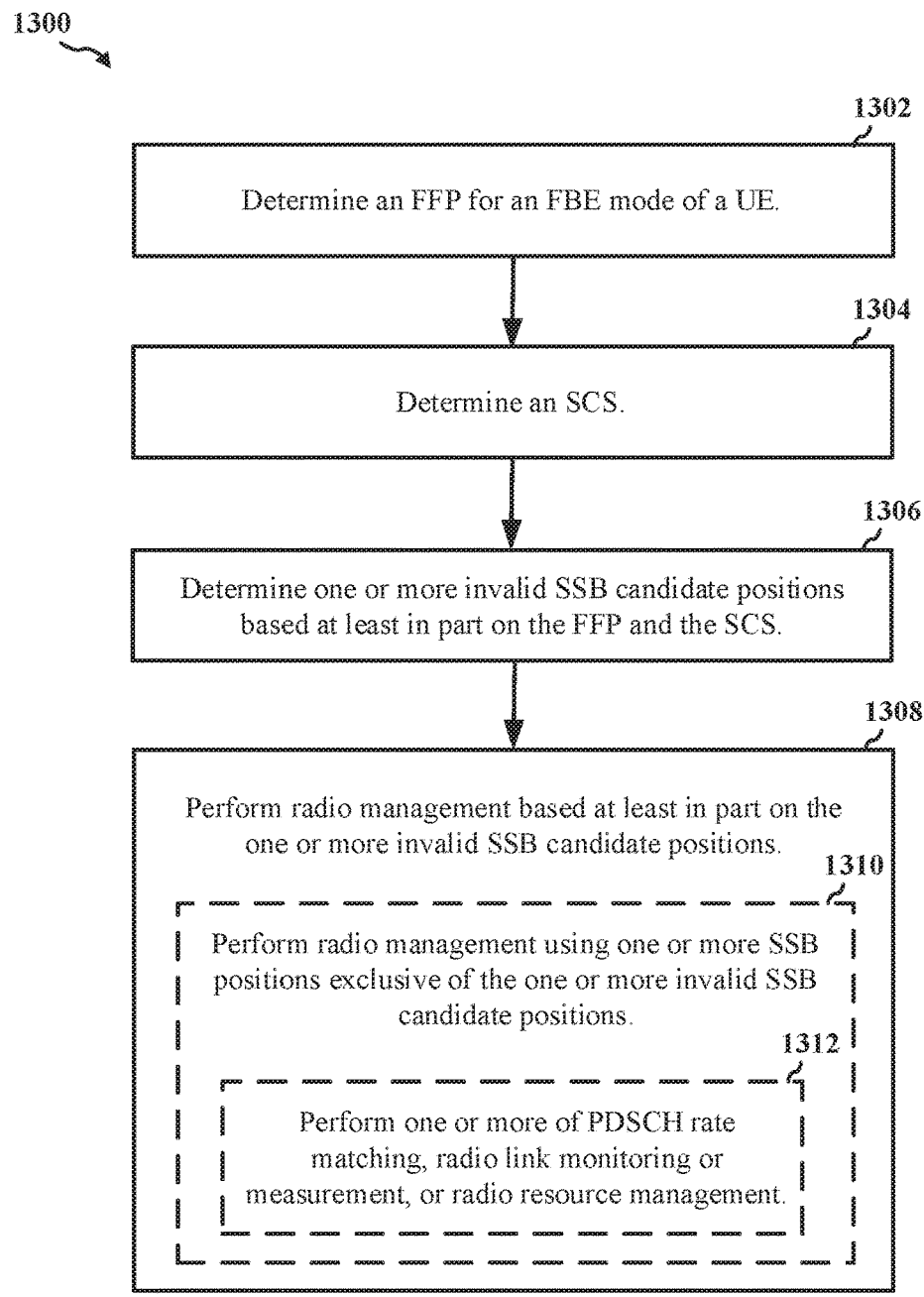
FIG. 13 shows a flowchart depicting an example operation for a UE to perform radio management based at least in part on one or more invalid synchronization signal block candidate positions that may be at least partially overlapping an idle period of a fixed frame period or in a latter part of a fixed frame period.

FIG. 13 shows a flowchart depicting an example operation 1300 for a UE to perform radio management based at least in part on one or more invalid SSB candidate positions that may be at least partially overlapping an idle period of an FFP or are in a latter part of an FFP. At 1302, the UE determines an FFP. At 1304, the UE determines an SCS. At 1306 the UE determines one or more invalid SSB candidate positions based at least in part on the FFP and the SCS. The invalid SSB candidate positions may be predefined based on the FFP and the SCS. For example, the invalid SSB candidate positions may be indicated in a standard from the 3GPP based at least in part on the FFP and the SCS, and such positions may be programmed into the UE (such as in a look-up table storing invalid SSB candidate positions based at least in part on the FFP and the SCS).

FIG. 14 shows a table 1400 of example invalid SSB candidate positions based on an FFP and an SCS. The table may indicate the SSB positions that may possibly overlap an idle period for any FFP or SSB positions that are after 8 SSB positions for an SSB burst in an FFP. The invalid SSB candidate positions may also be based on the half frame of a 20 ms block that includes the defined SSB positions (such as half frame A, B, C, or D as illustrated in FIG. 7). In some implementations, the UE may store a version of the table 1400 to determine one or more invalid SSB candidate positions. The SSB positions including the invalid SSB candidate positions are in a half frame (5 ms) of a 20 ms block during which an SSB burst is to be transmitted. If the SCS is 15 kHz, the ten defined SBS positions are 0-9 of the designated half frame (such as half frame A, B, C, or D in FIG. 7). If the SCS is 30 kHz, the twenty defined SBS positions are 0-19 of the designated half frame.

Referring to the table 1400, if the FFP is 1 ms and the SCS is 30 kHz, the invalid SSB candidate positions are positions 3, 7, 11, 15, and 19 (similar to table 1200 in FIG. 12). If the FFP is 2 ms and the SCS is 30 kHz, the invalid SSB candidate positions are positions 7 and 15 for the first half frame (first 5 ms), positions 3, 11, and 19 for the second half frame (second 5 ms), positions 7 and 15 for the third half frame (third 5 ms), and positions 3, 11, and 19 for the fourth half frame (fourth 5 ms). The entry in table 1400 is similar to table 1200 in FIG. 12. If the FFP is 2.5 ms and the SCS is 30 kHz, the invalid SSB candidate positions are positions 8, 9, 18, and 19. This entry is similar to table 900 in FIG. 9, which includes the subset of positions listed in the table 1200 in FIG. 12. If the FFP is 4 ms and the SCS is 30 kHz, the invalid SSB candidate positions are positions 8-15 for the first half frame (first 5 ms), positions 8-11 for the second half frame (second 5 ms), positions 7 and 16-19 for the third half frame (third 5 ms), and positions 3 and 12-19 for the fourth half frame (fourth 5 ms). The entry in table 1400 is a combination of the entry in table 900 in FIG. 9 and the entry in table 1200 in FIG. 12. If the FFP is 5 ms and the SCS is 30 kHz, the invalid SSB candidate positions are positions 8-19. This entry is similar to table 900 in FIG. 9, which includes the subset of positions listed in the table 1200 in FIG. 12. If the FFP is 10 ms and the SCS is 30 kHz, the invalid SSB candidate positions are positions 8-19. This entry is similar to table 900 in FIG. 9, which includes the subset of positions listed in the table 1200 in FIG. 12. If the FFP is 4 ms and the SCS is 15 kHz, the invalid SSB candidate positions are position 7 for the first half frame (first 5 ms), position 5 for the second half frame (second 5 ms), position 3 for the third half frame (third 5 ms), and positions 1 and 9 for the fourth half frame (fourth 5 ms). This entry is similar to table 1200 in FIG. 12. If the FFP is 5 ms and the SCS is 15 kHz, the invalid SSB candidate positions are positions 8 and 9. This entry is similar to table 900 in FIG. 9. If the FFP is 10 ms and the SCS is 15 kHz, the invalid SSB candidate positions are positions 8 and 9. This entry is similar to table 900 in FIG. 9. In comparing tables 900, 1200, and 1400, table 1400 is a combination of tables 900 and table 1200 (as shown, the SSB positions between similar entries in the tables 900 and 1200 are unioned for each entry of the table 1400).

Referring back to FIG. 13, the UE performs radio management based at least in part on the one or more invalid SSB candidate positions (1308). In some implementations, the UE performs radio management using one or more SSB positions exclusive of the one or more invalid SSB candidate positions (1310). For example, referring back to FIG. 14, if the FFP is 5 ms and the SCS is 30 kHz, the UE may prevent SSB positions 8-19 of a half frame from being used for radio management. For example, the UE does not listen during SSB positions 8-19 for an SSB. Referring back to FIG. 13, in some implementations of radio management, the UE may perform one or more of PDSCH rate matching, radio link monitoring or measurement, or radio resource management (1312).

In addition or alternative to one or more SSB positions being predefined as invalid, the DRS window length may be limited when the FFP is 5 ms or 10 ms. In some implementations, the parameter DiscoveryBurst-WindowLength-r16 may be configured. For example, the parameter DiscoveryBurst-WindowLength-r16 may be determined to be 2 ms if the SCS is determined to be 30 kHz. In another example, the parameter DiscoveryBurst-WindowLength-r16 may be determined to be 4 ms if the SCS is determined to be 15 kHz.

Also in addition or alternative to one or more SSB positions being predefined as invalid, the UE may determine a first eight SSB positions of an FFP (such as for each FFP) to be valid SSB positions. In this manner, the UE may use the first eight SSB positions to perform radio management. For example, the UE may listen for an SSB during the eight SSB positions, and the UE may perform one or more of PDSCH rate matching, radio link monitoring or measurement, or radio resource management based on SSBs received during the eight SSB positions. In some implementations, if the SCS is 15 kHz, the UE may consider the final two SSB positions in each FFP as invalid. If the SCS is 30 kHz, the UE may consider the final twelve SSB positions in each FFP as invalid.

The above implementations may apply to a signal from a serving cell or to a signal from a neighbor cell. For example, a UE may perform measurements for a neighbor cell (such as radio link measurements). If the signal is from a serving cell, the FFP is known based on information provided by the base station. However, if the signal is from a neighbor cell, the UE may not be able to determine the FFP from the neighbor cell signal. In some implementations, the UE determines the FFP of the neighbor cell signal to be the same as an FFP of a serving cell signal. In this manner, the UE may assume the FFPs match in order to determine invalid SSB candidate positions (or otherwise perform radio management). If an FFP of a serving cell signal is not known, the UE may assume that the FFP of the neighbor cell signal is 5 ms.

Through any combination of the above implementations, a UE may prevent using SSB positions for radio management (including listening for an SSB) when known that the base station will not transmit an SSB during the SSB positions. In this manner, the UE may conserve processing resources, and in some implementations, the UE may use such time for PDSCH communications (increasing the throughput of the channel).

Figure 15:
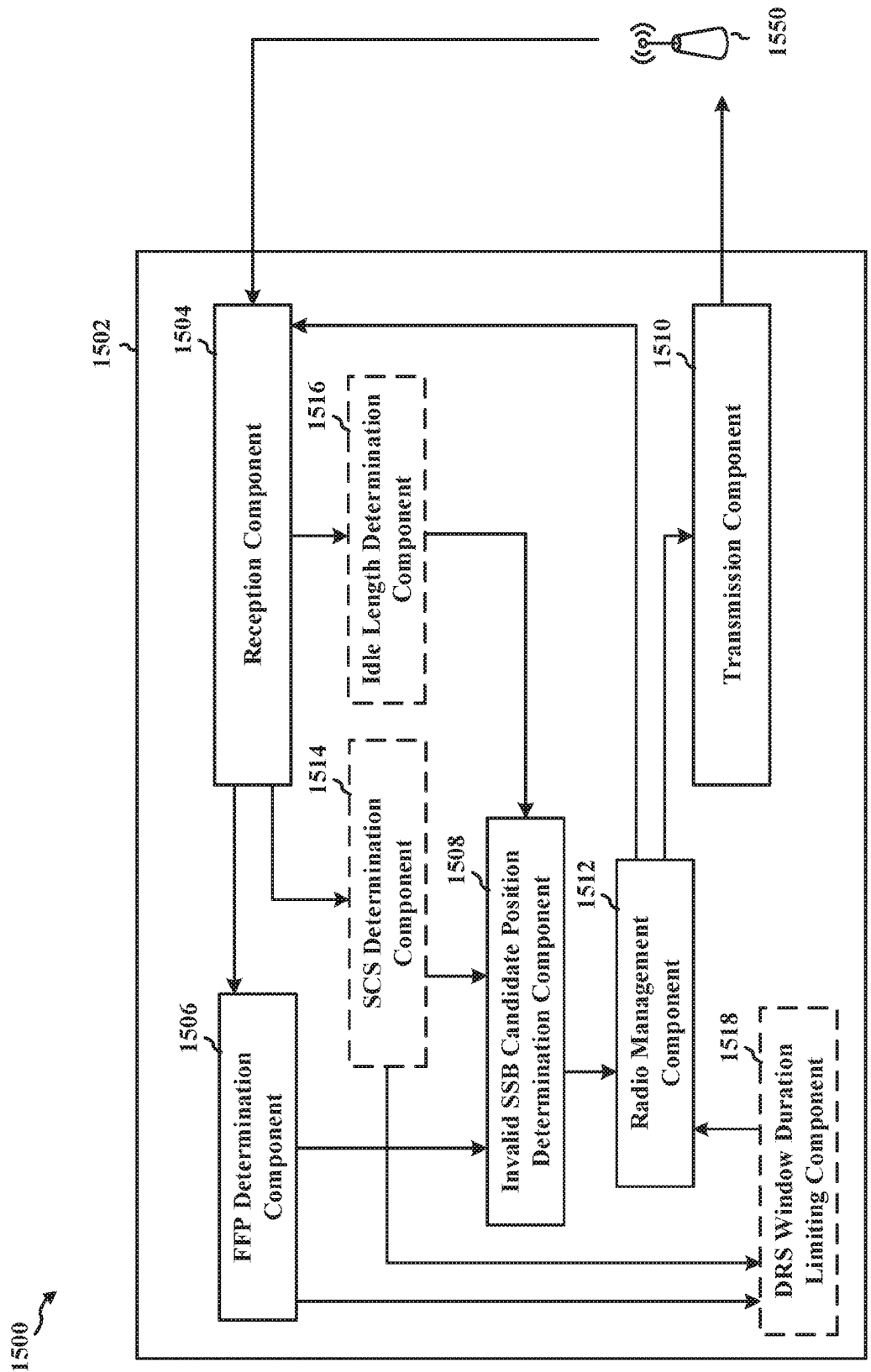
FIG. 15 is a conceptual data flow diagram illustrating the data flow between different means/components in an example apparatus in a UE.

FIG. 15 is a conceptual data flow diagram 1500 illustrating the data flow between different means/components in an example apparatus 1502. The apparatus may be (or included in) a UE. The apparatus 1502 may include a reception component 1504 that receives a signal from a base station 1550. The apparatus 1502 also includes an FFP determination component 1506 that determines an FFP for the UE in an FBE mode, an invalid SSB candidate position determination module 1508 that determines one or more invalid SSB candidate positions based at least in part on the FFP, and a radio management component 1512 that performs radio management based at least in part on the one or more invalid SSB candidate positions. The apparatus may also include a transmission component 1510 that transmits to the base station 1550. In some implementations, the radio management component 1512 may be coupled to the reception component 1504 or the transmission component 1510 to cause the apparatus 1502 to perform radio management. For example, the radio management component 1512 may cause the reception component 1504 to prevent listening for an SSB from the base station 1550 during one or more of the invalid SSB candidate positions determined by component 1508.

The apparatus 1502 may include additional components that perform each of the blocks of the algorithm in the aforementioned flowcharts of FIGS. 8, 10, 11, and 13 or as described in the examples herein. In some implementations, the apparatus 1502 may include an SCS determination component 1514 that determines an SCS for the received signal. The apparatus 1502 may also include an idle length determination component 1516 that determines an idle length of an idle period of an FFP. In some implementations, determining the one or more invalid SSB candidate positions by component 1508 may also be based on one or more of the SCS or the idle length. In some implementations, the apparatus 1502 may include a DRS window duration limiting component 1518 that limits a DRS window duration (such as by determining a parameter DiscoveryBurst-WindowLength-r16) based on the FFP and the SCS. The determined parameter DiscoveryBurst-WindowLength-r16 may be used for radio management by the radio management component 1512. As such, each block in the aforementioned flowcharts of FIGS. 8, 10, 11, and 13 or as described in the examples herein may be performed by a component, and the apparatus 1502 may include one or more of those components. The components of the apparatus 1502 may be one or more hardware components specifically configured to carry out the stated processes/algorithm, may be implemented by a processor configured to perform the stated processes/algorithm, may be stored within a computer-readable medium for implementation by a processor, or may be some combination thereof.

While example methods are described with reference to being performed by a UE, in some implementations, one or more of the method (or at least a portion of one or more methods) may be performed by a base station. The base station may serve the UE or may be of a neighbor cell to the UE.

Figure 16:
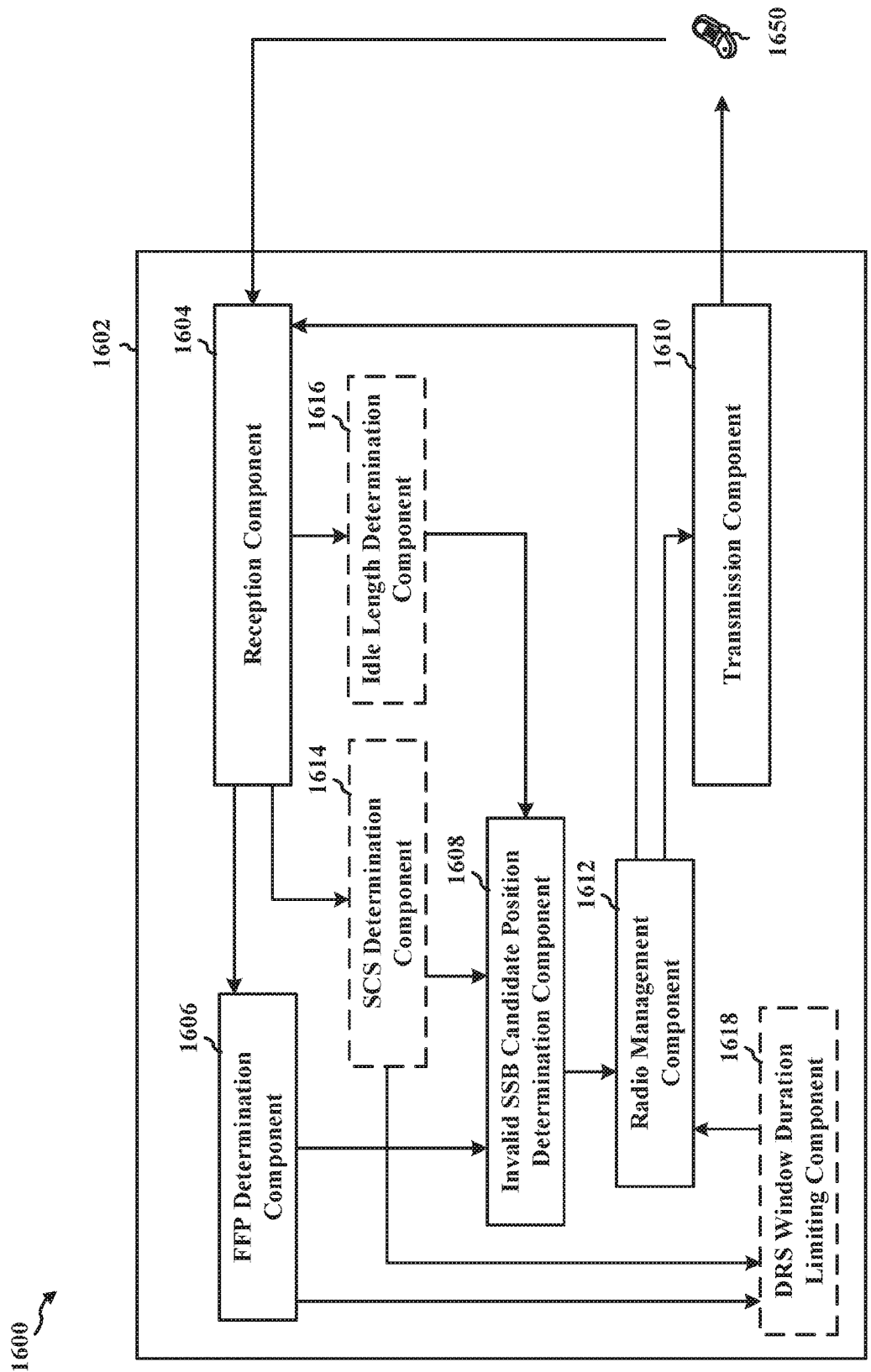
FIG. 16 is a conceptual data flow diagram illustrating the data flow between different means/components in an example apparatus in a base station.

FIG. 16 is a conceptual data flow diagram 1600 illustrating the data flow between different means/components in an example apparatus 1602. The apparatus may be (or included in) a base station transmitting to (or receiving from) a UE 1650. The apparatus 1602 may include a reception component 1604 that receives a signal from the UE 1650. The apparatus 1602 also includes a transmission component 1610 that transmits a signal to the UE 1650.

The apparatus 1602 may include an FFP determination component 1606 that determines an FFP for transmitting a signal to the UE 1650 in an FBE mode. The apparatus 1602 may also include an invalid SSB candidate position determination module 1608 that determines one or more invalid SSB candidate positions based at least in part on the FFP and a radio management component 1612 that performs radio management based at least in part on the one or more invalid SSB candidate positions. In some implementations, the radio management component 1612 may be coupled to the reception component 1604 or the transmission component 1610 to cause the apparatus 1602 to perform radio management. For example, the radio management component 1612 may cause the transmission component 1610 to prevent transmitting an SSB during one or more of the invalid SSB candidate positions determined by component 1608. In another example, the radio management component 1612 may cause the transmission component 1610 to include information regarding the FFP (or a parameter Discovery-Burst-WindowLength-r16 or other suitable parameters) in an RMSI (such as including an SIB1) transmitted to the UE 1650.

The apparatus 1602 may include additional components that perform each of the blocks of the algorithm in the aforementioned flowcharts of FIGS. 8, 10, 11, and 13 or as described in the examples herein. In some implementations, the apparatus 1602 may include an SCS determination component 1614 that determines an SCS. The SCS may be used for transmission by the transmission component 1610 to the UE 1650. The apparatus 1602 may also include an idle length determination component 1616 that determines an idle length of an idle period of an FFP. In some implementations, determining the one or more invalid SSB candidate positions by component 1608 may also be based on one or more of the SCS or the idle length. In some implementations, the apparatus 1602 may include a DRS window duration limiting component 1618 that limits a DRS window duration (such as by determining the parameter Discovery-Burst-WindowLength-r16) based on the FFP and the SCS. The determined parameter DiscoveryBurst-WindowLength-r16 may be used for radio management by the radio management component 1612. As such, each block in the aforementioned flowcharts of FIGS. 8, 10, 11, and 13 or as described in the examples herein may be performed by a component, and the apparatus 1602 may include one or more of those components. The components of the apparatus 1602 may be one or more hardware components specifically configured to carry out the stated processes/algorithm, may be implemented by a processor configured to perform the stated processes/algorithm, may be stored within a computer-readable medium for implementation by a processor, or may be some combination thereof.

Further disclosure is included in the Appendix.

As used herein, a phrase referring to "at least one of" or "one or more of" a list of items refers to any combination of those items, including single members. As an example, "at least one of: a, b, or c" or "one or more of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method performed by a user equipment (UE) for cellular communications, comprising:
   determining a fixed frame period (FFP) for a frame based equipment (FBE) mode of the UE;
   determining one or more invalid synchronization signal block (SSB) candidate positions based at least in part on the FFP; and
   performing radio management based at least in part on the one or more invalid SSB candidate positions.

2. The method of claim 1, wherein performing radio management based at least in part on the one or more invalid SSB candidate positions includes performing radio management using one or more SSB positions in the FFP exclusive of the one or more invalid SSB candidate positions.

3. The method of claim 2, wherein radio management of the UE includes one or more of:
    physical downlink shared channel (PDSCH) rate matching (RM);
    radio link monitoring or measurement (RLM); or
    radio resource management (RRM).

4. The method of claim 2, further comprising determining a subcarrier spacing (SCS) for SSBs, wherein determining the one or more invalid SSB candidate positions is also based at least in part on the SCS.

5. The method of claim 1, further comprising determining that a first eight SSB positions in each FFP are valid, wherein performing radio management of the UE using one or more SSB positions includes using one or more of the first eight SSB positions in each FFP.

6. The method of claim 5, wherein when the subcarrier spacing (SCS) is 15 kilohertz, determining a final two SSB positions out of a defined ten SSB positions in each FFP are invalid.

7. A method performed by a user equipment (UE) for cellular communications, comprising:
    determining a fixed frame period (FFP) of a cell for a frame based equipment (FBE) mode of the UE;
    determining one or more invalid synchronization signal block (SSB) candidate positions at least partially overlapping an idle period of the FFP based at least in part on the FFP; and
    performing radio management based at least in part on the one or more invalid SSB candidate positions.

8. The method of claim 7, wherein performing radio management based at least in part on the one or more invalid SSB candidate positions includes performing radio management using one or more SSB positions in the FFP exclusive of the one or more invalid SSB candidate positions.

9. The method of claim 8, wherein radio management includes one or more of:
    physical downlink shared channel (PDSCH) rate matching (RM);
    radio link monitoring or measurement (RLM); or
    radio resource management (RRM).

10. The method of claim 8, further comprising determining an idle length of the idle period, wherein determining the one or more invalid SSB candidate positions is also based at least in part on the idle length.

11. The method of claim 10, further comprising determining a subcarrier spacing (SCS) of SSBs, wherein determining the one or more invalid SSB candidate positions is also based at least in part on the SCS.

12. The method of claim 8, further comprising:
    determining an SSB position at least partially overlaps the idle period; and
    determining that the SSB position is included in the one or more invalid SSB candidate positions based at least in part on determining that the SSB position at least partially overlaps the idle period.

13. The method of claim 7, wherein the cell is a neighbor cell, further comprising:
    determining the FFP of the neighbor cell to be the same as an FFP of a serving cell.

14. A method performed by a user equipment (UE) for cellular communications, comprising:
    determining a fixed frame period (FFP) for a frame based equipment (FBE) mode of the UE;
    determining a subcarrier spacing (SCS) of synchronization signal blocks (SSBs) of a cell;
    determining one or more invalid SSB candidate positions based at least in part on the FFP and the SCS; and
    performing radio management based at least in part on the one or more invalid SSB candidate positions.

15. The method of claim 14, wherein performing radio management based at least in part on the one or more invalid SSB candidate positions includes performing radio management using one or more SSB positions in the FFP exclusive of the one or more invalid SSB candidate positions.

16. The method of claim 15, wherein radio management includes one or more of:
    physical downlink shared channel (PDSCH) rate matching (RM);
    radio link monitoring or measurement (RLM); or
    radio resource management (RRM).

17. The method of claim 14, further comprising limiting a discovery reference signal (DRS) window length based at least in part on the FFP when the FFP is 5 milliseconds or 10 milliseconds.

18. The method of claim 17, the DRS window length is limited by configuring a parameter DiscoveryBurst-WindowLength-r16.

19. The method of claim 18, further comprising:
    determining that the SCS is 30 kilohertz; and
    determining the parameter DiscoveryBurst-WindowLength-r16 to be 2 milliseconds in response to determining the SCS is 30 kilohertz.

20. The method of claim 18, further comprising:
    determining that the SCS is 15 kilohertz; and
    determining the parameter DiscoveryBurst-WindowLength-r16 to be 4 milliseconds in response to determining the SCS is 15 kilohertz.

21. The method of claim 14, further comprising determining that an SSB position in a first eight SSB positions in each FFP are valid, wherein performing radio management of the UE using one or more SSB positions includes using one or more of the first eight SSB positions in each FFP.

22. The method of claim 14, wherein the cell is a neighbor cell, further comprising:
    determining the FFP of the neighbor cell to be the same as an FFP of a serving cell.

23. A user equipment (UE), comprising:
    one or more memories; and
    one or more processors, coupled to the one or more memories, are configured to cause the UE to:
        determine a fixed frame period (FFP) of a cell for a frame based equipment (FBE) mode of the UE;
        determine one or more invalid synchronization signal block (SSB) candidate positions at least partially overlapping an idle period of the FFP based at least in part on the FFP; and
        perform radio management based at least in part on the one or more invalid SSB candidate positions.

24. The UE of claim 23, wherein the one or more processors are further configured to cause the UE to perform the radio management based at least in part on the one or more invalid SSB candidate positions further cause the UE to perform the radio management using one or more SSB positions in the FFP exclusive of the one or more invalid SSB candidate positions.

25. The UE of claim 24, wherein the radio management includes one or more of:
    physical downlink shared channel (PDSCH) rate matching (RM);
    radio link monitoring or measurement (RLM); or
    radio resource management (RRM).

26. The UE of claim 24, wherein the one or more processors are further configured to cause the UE to determine an idle length of the idle period, wherein the one or more invalid SSB candidate positions is based at least in part on the idle length.

27. The UE of claim 26, wherein the one or more processors are further configured to cause the UE to determine a subcarrier spacing (SCS) of SSBs, wherein the one or more invalid SSB candidate positions are based at least in part on the SCS.

28. A user equipment (UE), comprising:
one or more memories; and
one or more processors, coupled to the one or more memories, are configured to cause the UE to:
determine a fixed frame period (FFP) for a frame based equipment (FBE) mode of the UE;
determine a subcarrier spacing (SCS) of synchronization signal blocks (SSBs) of a cell;
determine one or more invalid SSB candidate positions based at least in part on the FFP and the SCS; and
perform radio management based at least in part on the one or more invalid SSB candidate positions.

29. The UE of claim 28, wherein the one or more processors are further configured to cause the UE to perform the radio management based at least in part on the one or more invalid SSB candidate positions further cause the UE to perform radio management using one or more SSB positions in the FFP exclusive of the one or more invalid SSB candidate positions.

30. The UE of claim 29, wherein the radio management includes one or more of:
physical downlink shared channel (PDSCH) rate matching (RM);
radio link monitoring or measurement (RLM); or
radio resource management (RRM).

31. The UE of claim 28, wherein the one or more processors are further configured to cause the UE to limit a discovery reference signal (DRS) window length based at least in part on the FFP when the FFP is 5 milliseconds or 10 milliseconds.

32. The UE of claim 31, wherein the DRS window length is limited by configuring a parameter DiscoveryBurst-WindowLength-r16.

33. The UE of claim 32, wherein the one or more processors are further configured to cause the UE to:
determine that the SCS is 30 kilohertz; and
determine the parameter DiscoveryBurst-WindowLength-r16 to be 2 milliseconds in response to determining that the SCS is 30 kilohertz.

34. The UE of claim 32, the one or more processors are further configured cause the UE to:
determine that the SCS is 15 kilohertz; and
determine the parameter DiscoveryBurst-WindowLength-r16 to be 4 milliseconds in response to determining the SCS is 15 kilohertz.

35. The UE of claim 32, wherein the one or more processors are further configured to cause the UE to determine that an SSB position in a first eight SSB positions in each FFP are valid, wherein the radio management of the UE using one or more SSB positions uses one or more of the first eight SSB positions in each FFP.

* * * * *